(12) United States Patent
Sperr et al.

(10) Patent No.: US 7,702,999 B1
(45) Date of Patent: Apr. 20, 2010

(54) NETWORK-BASED, INFORMATION MANAGEMENT SYSTEM AND METHOD

(75) Inventors: Douglas Sperr, Phoenix, AZ (US); Scott Wessels, Phoenix, AZ (US)

(73) Assignee: DC Future LLC, Phoenix, AZ (US)

( * ) Notice: Subject to any disclaimer, the term of this patent is extended or adjusted under 35 U.S.C. 154(b) by 1777 days.

(21) Appl. No.: 10/306,093

(22) Filed: Nov. 27, 2002

(51) Int. Cl.
*G06F 17/00* (2006.01)

(52) U.S. Cl. ............... 715/222; 715/203; 715/221; 715/223; 709/203

(58) Field of Classification Search ............ 715/506, 715/511, 516, 203, 221, 222, 223; 709/203
See application file for complete search history.

(56) References Cited

U.S. PATENT DOCUMENTS

| | | | |
|---|---|---|---|
| 6,589,290 B1 * | 7/2003 | Maxwell et al. ............ | 715/507 |
| 6,845,390 B1 * | 1/2005 | Jorgenson et al. .......... | 709/205 |
| 6,963,974 B1 * | 11/2005 | Skinner et al. ............. | 713/176 |
| 2004/0070609 A1 * | 4/2004 | Estrada ..................... | 345/751 |

* cited by examiner

*Primary Examiner*—Stephen S Hong
*Assistant Examiner*—Matthew J Ludwig
(74) *Attorney, Agent, or Firm*—Schwegman Lundberg & Woessner, P.A.

(57) ABSTRACT

A system and method for managing information over a network (104, FIG. 1) enables a user, at a client computer (102) to access and modify information accessible to a server (106). A user can create (FIG. 10) a new manageable entity (e.g., a project), which results in storage of entity-specific and non-specific information (FIG. 12) in a database (108, FIG. 1). In addition, a user can create or edit (FIG. 17) various forms, which can be associated with one or more manageable entities. Information describing the form (FIG. 21) is then maintained by the system. The form can then be used to enter or modify data associated with the manageable entity.

59 Claims, 20 Drawing Sheets

| 402 | 404 | 406 | 408 | 410 | 412 |
|---|---|---|---|---|---|
| USER ID | USER NAME | PASSWORD | USER LEVEL | LOGOUT | SESSION |
| 614 | DOUG SIR | ROOSTER4 | HIGH | | 82902011 |
| 8 | SCOTT WEST | NIR7VANA | ADMIN | | 71402002 |
| 47 | AMY TAN | 62SABFRAN | LOW | | 21201144 |
| ... | ... | ... | ... | ... | ... |

FIG. 4

| 502 | 504 |
|---|---|
| REQUEST TYPE | USER LEVEL |
| VIEW PORTAL | LOW |
| VIEW PROJECT | LOW |
| VIEW FORM | MED |
| CREATE FORM | HIGH |
| EDIT FORM | HIGH |
| DELETE FORM | ADMIN |

FIG. 5

ACME BUILDERS

ONLINE PROJECT MANAGEMENT

PROJECTS

EDIT MY INFO | ADMIN AREA | CONTACT DIR | LIST PROJECTS | CORP. PORTAL

USER: WESSELS, SCOTT

PROJECTS FOUND: 9

FILTER BY: [ALL ▽]   SELECT STATE: [ARIZONA ▽]   SELECT TYPE: [ALL ▽]   [GO =>]

| PROJECT | PROJ # | MANAGER | ADDRESS | CITY | STATE | TYPE |
|---|---|---|---|---|---|---|
| COFFEETYME TI | 104 | LEATHERS | 727 E. BETHANY HOME RD. | PHOENIX | AZ | MINOR TI |
| GRAYSON RESIDENCE | 123 | SPERR | 21000 N. TATUM BLVD. | PHOENIX | AZ | GROUND UP |
| PHIPPS REMODEL | 167 | WESSELS | 19601 N. 27TH AVE. | PHOENIX | AZ | REMODEL |

ACME BUILDERS — ONLINE PROJECT MANAGEMENT

123 E. MAIN ST. EL CAJON, CA 92031  TEST PROJECT A1

EDIT MY INFO | ADMIN AREA | MANAGE NOTICES | BULLETINS | CONTACT DIR
PROJECT HOME | LIST PROJECTS | CORP. PORTAL | ONLINE HELP

USER: WESSELS, SCOTT

PROJECT HOME

TEST PROJECT A1 — 902

PROJECT MANAGER:
WESSELS, SCOTT

PROJECT DIRECTOR:
WESSELS, SCOTT

PROJECT NUMBER:
1

PROJECT ADDRESS:
123 E. MAIN ST.
EL CAJON, CA 92031

PROJECT INFO — 904

PROJECT PROFILE
CONTACT DIRECTORY
PROJECT SCHEDULE
CALENDAR
IMAGE CENTER
DRAWINGS

FILES — 906

COMMUNICATE & FILE
DOCUMENT CENTER
CONFIDENTIAL DOCUMENTS
LETTERS OF TRANSMITTAL
REQUEST FOR INFORMATION

TOOLS — 908

REPORTS
FORMS
PRESENTATIONS

FIG. 9

ADD NEW PROJECT FORM
ADMIN AREA

ADMIN HOME | LIST PROJECTS | CORP. PORTAL

PROJECT SET UP INFORMATION

PROJECT NAME: ~1102
PROJECT MANAGER: [SELECT A MANAGER ▷] ~1104
PROJECT DIRECTOR: [SELECT A DIRECTOR ▷]
PROJECT NUMBER: ~1102
PROJECT TYPE: [SELECT PROJECT TYPE ▷]
PROJECT FILTER: [SELECT FILTER ▷]

PROJECT DESCRIPTION:

HOME PAGE IMAGE: [_____] [BROWSE...] ~1106
IF YOU DO NOT HAVE THE EXACT ADDRESS, YOU MAY ENTER CROSS STREETS, USING THE FOLLOWING FORMAT:
CROSS STREET 1 & CROSS STREET 2

ADDRESS: ~1102
CITY: ~1102
STATE: [SELECT STATE ▷]
ZIP CODE:

TO CHECK IF THIS ADDRESS IS FOUND BY THE MAP SOFTWARE, CLICK HERE. [CHECK MAP] ~1106

SELECT A PROJECT TO IMPORT DATA. [SELECT NEW ▷]

[SUBMIT] ~1108

FIG. 11

| PROJECT ID 1202 | PROJECT NAME 1204 | ADDRESS 1 1206 | ADDRESS 2 1208 | MANAGER 1210 | DIRECTOR 1212 | PROJECT TYPE 1214 |
|---|---|---|---|---|---|---|
| 1 | COFFEETYME | 3201 W. BELL | PHOENIX, AZ | JOHN FLYNN | TONY MARTIN | MINOR TI |
| 2 | GRAYSON RES | 615 CORAL RD. | MIAMI, FL | SUE ASCOTT | BILL TRUE | 12 |
| 3 | PHIPPS REMO | 27 ARCH ST. | ST. LOUIS, MO | ABE MONK | TONY MARTIN | 4 |
| ... | ... | ... | ... | ... | ... | ... |

FIG. 12

ACME BUILDERS

ONLINE PROJECT MANAGEMENT

CONTRACTOR PAYMENT RECORDS

EDIT MY INFO | ADMIN AREA | CONTACT DIR
PROJECT HOME | LIST PROJECTS | CORP. PORTAL

CONTACTS | FINANCE | CONTRACTS | USERS | PROJECTS | PROFIT SITES | WORK TRACKING | CALENDAR | RAMP UP | BUSINESS | RESEARCH | MARKETING

USER: WESSELS, SCOTT

CONTRACTOR PAYMENT RECORDS—FORMS—ONLINE PROJECT MANAGEMENT—AZ

POST NEW—SEARCH—FLIP LOGS

| TRACKING NO. | DATE CHECK RECEIVED (MM/DD/YYYY) | DATE OF CHECK (MM/DD/YYYY) | CHECK NUMBER | AMOUNT OF CHECK ($0,000.00) | PROJECT NAME | CITY | STATE | STORE NUMBER | CONTACT | CONTACT COMPANY |
|---|---|---|---|---|---|---|---|---|---|---|
| 1 | 09/22/2000 | 09/08/2000 | 5740 | $1,200.00 | GREENWOOD | GREENWOOD | IN | 1065 | — | S CONSTRUCTION |
| 2 | 01/16/2001 | 12/29/2000 | 71475 | $1,200.00 | BRECKENRIDE FARMS | TWIN FALLS | ID | — | GREG McENTAR | WOOD GROUP |
| 3 | 01/18/2001 | 12.06/2000 | 70886 | $1,200.00 | LOGAN, UT | LOGAN | UT | — | RAYMOND SPENCE | WOOD GROUP |
| 4 | 01/25/2001 | 01/17/2001 | 1563 | $1,200.00 | PAVILLION COURT | DALLAS | TX | 1044 | LOU B. COY | J.P. BLA PROPERTIES |

FIG. 14

ACME BUILDERS

ONLINE PROJECT MANAGEMENT

EDIT MY INFO | ADMIN AREA | CONTACT DIR
PROJECT HOME | LIST PROJECTS | CORP. PORTAL
CONTACTS | FINANCE | CONTRACTS | USERS | PROJECTS | PROFIT SITES | WORK TRACKING | CALENDAR | RAMP UP | BUSINESS | RESEARCH
MARKETING                                                                                                            USER: WESSELS, SCOTT

CONTRACTOR PAYMENT
RECORDS ENTRY

CONTRACTOR PAYMENT RECORDS—FORMS—ONLINE PROJECT MANAGEMENT—AZ                        LOGS | SEARCH

POST NEW | EDIT POST | DELETE POST

CONTRACTOR PAYMENT
RECORDS
TRACKING NO.:                                    1
DATE CHECK RECEIVED (MM/DD/YYYY):                09/22/2000
DATE OF CHECK (MM/DD/YYYY):                      09/08/2000
CHECK NUMBER:                                    5740
AMOUNT OF CHECK ($0,000.00):                     $1,200.00
PROJECT NAME:                                    GREENWOOD
CITY:                                            GREENWOOD
STATE:                                           IN
STORE NUMBER:                                    1065
CONTACT:
EMAIL:
COMPANY:                                         S CONSTRUCTION
COMMENTS/ADDITIONAL USERS:
EMAIL DISTRIBUTION LIST:

ADDITIONAL EMAILS:                               SEPERATE MULITPLE EMAILS WITH A COMMA

LAST MODIFIED:           1504 — 10/26/2001 11:52
CREATED:                        10/14/2001 19:51 — 1502

POST NEW | EDIT POST | DELETE POST

FIG. 15

ACME BUILDERS
ONLINE PROJECT MANAGEMENT

EDIT MY INFO | ADMIN AREA | CONTACT DIR
PROJECT HOME | LIST PROJECTS | CORP. PORTAL
CONTACTS | FINANCE | CONTRACTS | USERS | PROJECTS | PROFIT SITES | WORK TRACKING | CALENDAR | RAMP UP | BUSINESS | RESEARCH
MARKETING
USER: WESSELS, SCOTT

CONTRACTOR PAYMENT RECORDS—FORMS—ONLINE PROJECT MANAGEMENT—AZ

CONTRACTOR PAYMENT
RECORDS

POST NEW | SEARCH

CONTRACTOR PAYMENT ~1602
RECORDS
TRACKING NO.          41 ~1606
DATE CHECK RECEIVED (MM/DD/YYYY):    ~1608
DATE OF CHECK (MM/DD/YYYY):
CHECK NUMBER:
AMOUNT OF CHECK ($0,000.00):
PROJECT NAME:
CITY:
STATE:
STORE NUMBER:
CONTACT:
EMAIL:
COMPANY:
COMMENTS/ADDITIONAL USERS:

EMAIL DISTRIBUTION LIST:
CONTACTS MUST BE HIGHLIGHTED.
GIBSON, MARY
LEATHERS, MIKE
MILLER, TONY
RIVERS, LYA
HOLD CONTROL KEY TO SELECT MULTIPLE CONTACTS.

ADDITIONAL EMAILS:
SEPARATE MULTIPLE EMAILS WITH A COMMA
1610~ [SUBMIT]  [CANCEL] ~1612

FIG. 16

ACME BUILDERS

ONLINE PROJECT MANAGEMENT

EDIT MY INFO | ADMIN AREA | CONTACT DIR
PROJECT HOME | LIST PROJECTS | CORP. PORTAL

CONTACTS | FINANCE | CONTRACTS | USERS | PROJECTS | PROFIT SITES | WORK TRACKING | CALENDAR | RAMP UP | BUSINESS | RESEARCH
MARKETING
USER: WESSELS, SCOTT

SELECT A FORM

SELECT A FORM OR BUILD ONE

1802 —
- SHOP DRAWINGS AND SUBMITTAL LOGS (0/7)
- PRESENTATION UPLOAD FORM (0/2)
- CTR (0/0)
- RESPONSE FORM (0/10)
- WORK AUTHORIZATION FORM (0/0)
- SOFTWARE LICENSE TRACKING FORM (0/0)
- CONTRACTOR PAYMENT RECORDS (0/0)
- CUSTOMER PAYMENT RECORDS (0/0)
- PRELIMINARY SITE INVESTIGATION REPORT
- SITE EXECUTIVE SUMMARY
- INCOMING LETTERS OF TRANSMITTAL (0/0)
- PRE OPENING DELIVERABLE CHECKLIST FORM (0/0)

USE ~ 1804
EDIT ~ 1806
DELETE ~ 1808
NEW ~ 1810
IMPORT ~ 1812

< >

LEGEND:
(n/N) RECENT POSTS (<24HR) VERSUS TOTAL POSTS
\* STATIC FORM THAT HAS NO DATA IN THIS PROJECT
G GLOBAL FORM
P PROJECT SPECIFIC FORM

VIEW SUMMARY

FIG. 18

ACME BUILDERS

ONLINE PROJECT MANAGEMENT

EDIT MY INFO | ADMIN AREA | CONTACT DIR
PROJECT HOME | LIST PROJECTS | CORP. PORTAL
PROJECT HOME | CALENDAR | RAMP UP | BUSINESS | RESEARCH |

USER: WESSELS, SCOTT

BUILD FORM: NEW

CONTACTS | FINANCE | CONTRACTS | USERS | PROJECTS | PROFIT SITES | WORK TRACKING | MARKETING

| FORM NAME: | ~1902 | |
|---|---|---|
| FORM TYPE: | STATIC ▽ ~1904 | |
| FORM AVAILABILITY/SCOPE: | ⦿ ALL UNIQUE<br>○ ALL PROJECTS COMBINED<br>○ THIS PROJECT ONLY | ~1906 |
| COPY FORM LAYOUT: | SELECT A FORM ▽ | ~1908 |
| 1910—[CREATE] [CANCEL] | | |

FIG. 19

| FORM ID | FORM NAME | PROJECT ID | FORM TYPE | DEFINITION |
|---|---|---|---|---|
| 1 | PROJECT INFO | 5 | STATIC | ********** |
| 2 | BID | 0 | LOGGED | ********** |
| 3 | CHANGE REQ | 0 | LOGGED | ********** |
| ... | ... | ... | ... | ... |

FIG. 21

NETWORK-BASED, INFORMATION MANAGEMENT SYSTEM AND METHOD

TECHNICAL FIELD OF THE INVENTION

The present invention relates generally to computer-implemented systems and methods for managing information, and more specifically, to systems and methods for managing information where a set of team members access and edit information relating to a manageable entity over a network connection.

BACKGROUND OF THE INVENTION

In many types of projects and processes, multiple individuals are involved in creating, editing, reviewing, or tracking electronically-stored information. With the advent of the Internet and other network technologies, systems have been developed which enable an individual, via a client computer, to request remotely stored information from a server.

In the construction industry, for example, systems have been developed that enable team members (e.g., owner, contractor, architect, sub-contractors, etc.) to access documents and schedules, request approvals, track project milestones and tasks, inform teammates of changes, and collaborate and approve designs. Using these systems, an individual initiates an application program stored on the client. Based on user inputs, the application program creates and processes messages that are exchanged with a server. These messages enable project-related information to be sent to and retrieved from the server.

Autodesk Construction Manager is an example of such a system. In this system, an individual invokes a Construction Manager application program on a client computer, and the application program interacts with a server over the Internet to securely access project-related information. In addition, an individual can input project-related information using utilities and construction-related templates stored on the client computer. For example, a schedule utility associated with the Construction Manager enables an individual to create or modify the project schedule. As another example, an RFI (request for information) template enables an individual to create a specific RFI for distribution to one or more team members.

One disadvantage to prior art systems is that the client computer must be able to store and execute the appropriate application program in order to access the project-related information. Therefore, if an individual only has access to a computer without the application program, the individual will not be able to access the information. In addition, a client computer must have sufficient memory and processing capabilities to be able to store and execute the application program, and it is necessary to reload the application program in order to maintain the most up-to-date versions.

Another disadvantage to prior art systems is that project-related information can only be input using pre-defined templates. Accordingly, the manner in which project-related information is stored and the types of project-related information that can be stored cannot be specified by an individual.

Still another disadvantage to prior art systems is that these systems are typically applicable to only one or a few types of projects, and they are not useable for other manageable entities. For example, the Autodesk Construction Manager can be used to manage a construction project, but cannot be used by an individual to manage a day care business.

Accordingly, what is needed is a system and method that do not require a client computer to store and execute particular application software in order for an individual to access project-related information. Further needed is a system and method that enable individuals to input and extract project-related information in a format that the individual determines. Further needed is a system and method that can be used to manage information in conjunction with any type of manageable entity, and not just for a specific set of project types that are pre-defined by the system.

BRIEF DESCRIPTION OF THE DRAWINGS

FIG. 4 illustrates an example of a Master List table in accordance with one embodiment of the present invention;

FIG. 5 illustrates an example of an Access Settings table in accordance with one embodiment of the present invention;

FIG. 8 illustrates an example of a Project List page in accordance with one embodiment of the present invention;

FIG. 9 illustrates an example of a Project Home page in accordance with one embodiment of the present invention;

FIG. 11 illustrates an example of an Add New Project form in accordance with one embodiment of the present invention;

FIG. 12 illustrates an example of a Project Profile table in accordance with one embodiment of the present invention;

FIG. 14 illustrates an example of a Logged Entry list in accordance with one embodiment of the present invention;

FIG. 15 illustrates an example of a logged entry in accordance with one embodiment of the present invention;

FIG. 16 illustrates an example of a Logged Entry form in accordance with one embodiment of the present invention;

FIG. 18 illustrates an example of a Form-Builder Selection page in accordance with one embodiment of the present invention;

FIG. 19 illustrates an example of a Build New Form page in accordance with one embodiment of the present invention;

FIG. 21 illustrates an example of a Form List table in accordance with one embodiment of the present invention.

DETAILED DESCRIPTION OF THE PREFERRED EMBODIMENTS

Figure 1:
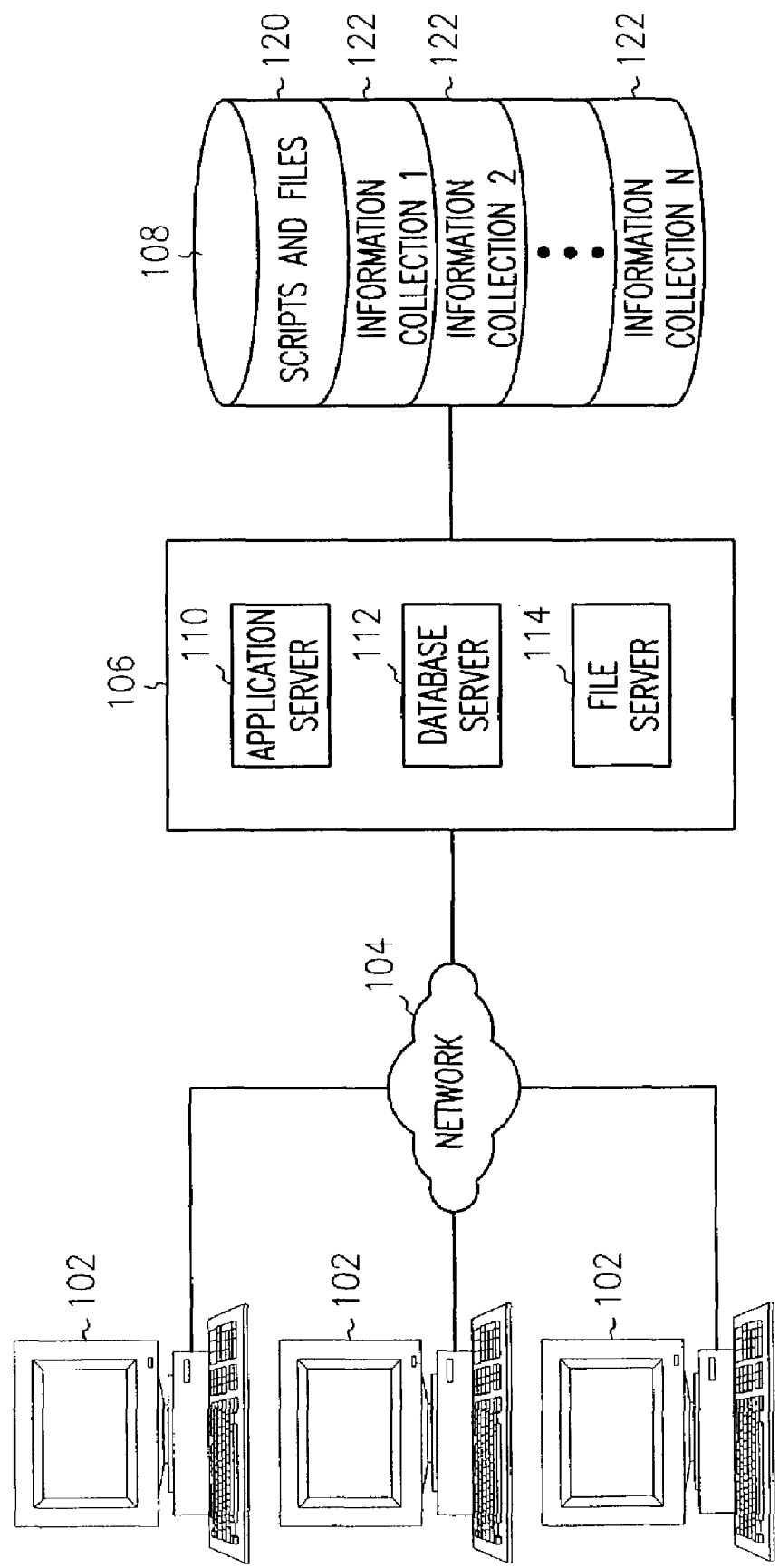
FIG. 1 illustrates a simplified block diagram of a computer system in accordance with one embodiment of the present invention.

In the following detailed description of the preferred embodiments, reference is made to the accompanying drawings, which form a part hereof, and in which are shown by way of illustration specific embodiments in which the invention may be practiced. These embodiments are described in sufficient detail to enable those skilled in the art to practice the invention, and it is to be understood that other embodiments may be utilized and that process or system changes could be made without departing from the scope of the present invention.

Terminology

As used in the description of the preferred embodiments, the following terms are defined as follows:

"Business unit" means an entity, such as an individual or company, for which a collection of information is managed by the system in accordance with various embodiments.

"Information collection" and "collection of information" mean non-specific information and entity-specific information stored for and associated with a particular business unit.

"Manageable entity" means any entity or activity that has an associated set of entity-specific information. A manageable entity can have a finite or infinite life. For example, but not by way of limitation, a manageable entity could be a construction project, a real estate management program, a human resources hiring program, an inventory tracking process, a referral service, a database, or any of an infinite variety of other entities or activities.

"Entity-specific information set" means a set of electronically-stored information that pertains to a specific manageable entity. For example, but not by way of limitation, an entity-specific information set could include entity-specific form definitions, data, scripts, files, contact information, personal information, reports, drawings, documents, presentations, schedules, images, specifications, and other information.

"Non-specific information set" means a set of electronically-stored information that can pertain to one or multiple manageable entities within a business unit. For example, but not by way of limitation, a non-specific information set could include form tables and other tables, non-specific form definitions, data, scripts, files, contact information, personal information, and other information.

"Form" means an electronically-displayable document that includes one or more form elements that a client computer user can manipulate to specify entity-specific information or non-specific information pertaining to one or multiple manageable entities within a business unit.

"Form element" means an element of a form that can be manipulated by a client computer user to produce information. For example, but not by way of limitation, a form element could be a static text field, spacer, select list, list, radio button, radio button group, check box, check box group, data entry field, calculation field, attachment, spreadsheet, matrix, URL, or other type of user-specifiable element that can be found in an electronically-displayable form.

"Form-builder utility" means an electronic tool that enables a client computer user to specify or edit the form elements and the definition information for a form. A form-builder utility may include some or all of the following abilities: add form element; delete form element; arrange or rearrange form elements with respect to each other; manipulate form element; import form elements from another form; and specify defaults and values for one or more form elements.

"Form definition" or "definition information" means a set of compressed or uncompressed information that defines the types and arrangements of form elements associated with a particular form.

DESCRIPTION OF THE EMBODIMENTS

Various embodiments of the present invention provide a network-based, information management system and method, in which a client computer user can access and manipulate information, over a network, that pertains to one or more manageable entities. In various embodiments, a system and method are provided that do not require a client computer to store and execute particular application software in order for an individual to access entity-specific information. Instead, in one embodiment, some or all software applications are executed by a server, which interacts with a client computer browser to enable the user to access the system. In addition, the system and method of the various embodiments enable individuals to input and extract entity-specific information in a format that the individual determines, by providing the ability for the user to create or use customizable forms.

The description uses an example of managing information relating to a construction project. However, the system and method of the various embodiments can be used to manage information in conjunction with virtually any type of manageable entity, and not just for a specific set of project types that are pre-defined by the system. This is accomplished by providing a flexible method for setting up a manageable entity on the system, and enabling system users to create customizable forms for inputting information into the system.

FIG. 1 illustrates a typical computer system within which the various embodiments of the present invention can be practiced. The system includes multiple client computers 102, each connected to one or more server computers 106 through one or more communication networks 104.

Client computers 102 could include, for example, stationary or portable personal computers (e.g., desktop or laptop computers). In addition, client computers 102 could include other devices that are capable of executing a browser and/or accessing a network through a wired or wireless connection. For example, client computers 102 could include handheld computing devices, pagers, specially-equipped television systems, and other types of devices.

Each client computer 102 includes one or more processors and one or more external network interfaces (e.g., ports). Each network interface allows a client computer 102 to send and receive messages from network 104. For example, a particular network interface could be an Ethernet port, fast Ethernet port, DSL port, or cable modem. In one embodiment, each network interface is a TCP/IP network interface, although other types of interfaces could be used, in other embodiments.

In one embodiment, each client computer 102 is capable of running one or more instances of a browser. As will be described in detail later, the browser enables a user of the client computer 102 to access remotely-stored information pertaining to one or more manageable entities.

Server computer 106 could be, for example, a stationary desktop, mainframe, or other computing device. Server computer 106 accesses information, files, and data stored within a database 108. In one embodiment, an application server 110 resident on server 106 executes scripts, which enable windows and forms to be displayed on client computers 102. A database server 112 resident on server 106 interacts with application server 110 to access database 108. In addition, a file server 114 resident on server 106 interacts with application server 110 to access files (e.g., HTML files) stored on server 110, database 108, or elsewhere.

In other embodiments, multiple servers 106 could be included in the system. Each of the multiple servers 106 could include an application server 110, database server 112, and file server 114. Alternatively, the application server 110, database server 112, and/or file server 114 could be implemented on separate server computers 106.

Each of the client and server computers 102, 106 are housed on one or more PC boards. In addition, each can include one or more microprocessors, busses, power supplies, storage medium, and one or more interfaces to outside networks. In one embodiment, each of these devices is coupled to bus, so that signals and power can be exchanged between devices. However, it is to be understood that in alternative embodiments, each of the devices could be coupled together through different busses.

The interfaces provide network connections between computers 102, 106 and one or more networks. Accordingly, the interfaces enable the exchange of messages between computers 102, 106. These messages are processed and/or created by one or more microprocessors or other processing devices. In addition the microprocessor(s) on server computer 106 executes application server 110, which runs one or more scripts that enable client computers 102 to access information in accordance with the various embodiments of the present invention.

Besides executing the various embodiments on a general-purpose computer system, computer executable instructions for performing the methods of the various embodiments can be stored on one or more computer readable media. For example, such computer executable instructions can be stored on RAM, ROM, hard drive, CD, magnetic disk, disk drive, a combination of these types of storage media, and/or other types of storage media that are well known to those of skill in the art.

Network 104 could be any of various types of networks. For example, network 104 could be the Internet, a local area network (LAN), wide area network (WAN), Ethernet link, DSL system, telephone system or combinations of these or other types of networks. Although FIG. 1 illustrates each computer 102, 106 being interconnected with a single network 104, in other embodiments, each computer 102, 106 could be connected through different networks. For ease of illustration, only one network 104 is shown. In addition, although FIG. 1 implies hardwired connections between each computer 102, 106 and the network 104, wireless connections also could be implemented.

Database 108 can include one or more types of information storage devices. Some or all of database 108 can be resident on server computer 106, or can reside on one or more stand-alone computers (not shown).

In one embodiment, database 108 is used to store scripts and files 120, data, tables, and other information. As will be described in more detail later, the system can be used to manage information for one or multiple business units (e.g., companies, individuals, etc.). Accordingly, in one embodiment, the database 108 includes an information collection 122 for each of 1 to N business units. The information collection 122 for each business unit could be stored in a contiguous memory block, as FIG. 1 illustrates, or could be interleaved with other information. The information stored in database 108 is accessible to server computer 106, and can be provided to or manipulated by a user of a client computer 102, as long as the user has the appropriate permissions, as will be described later.

Figure 2:
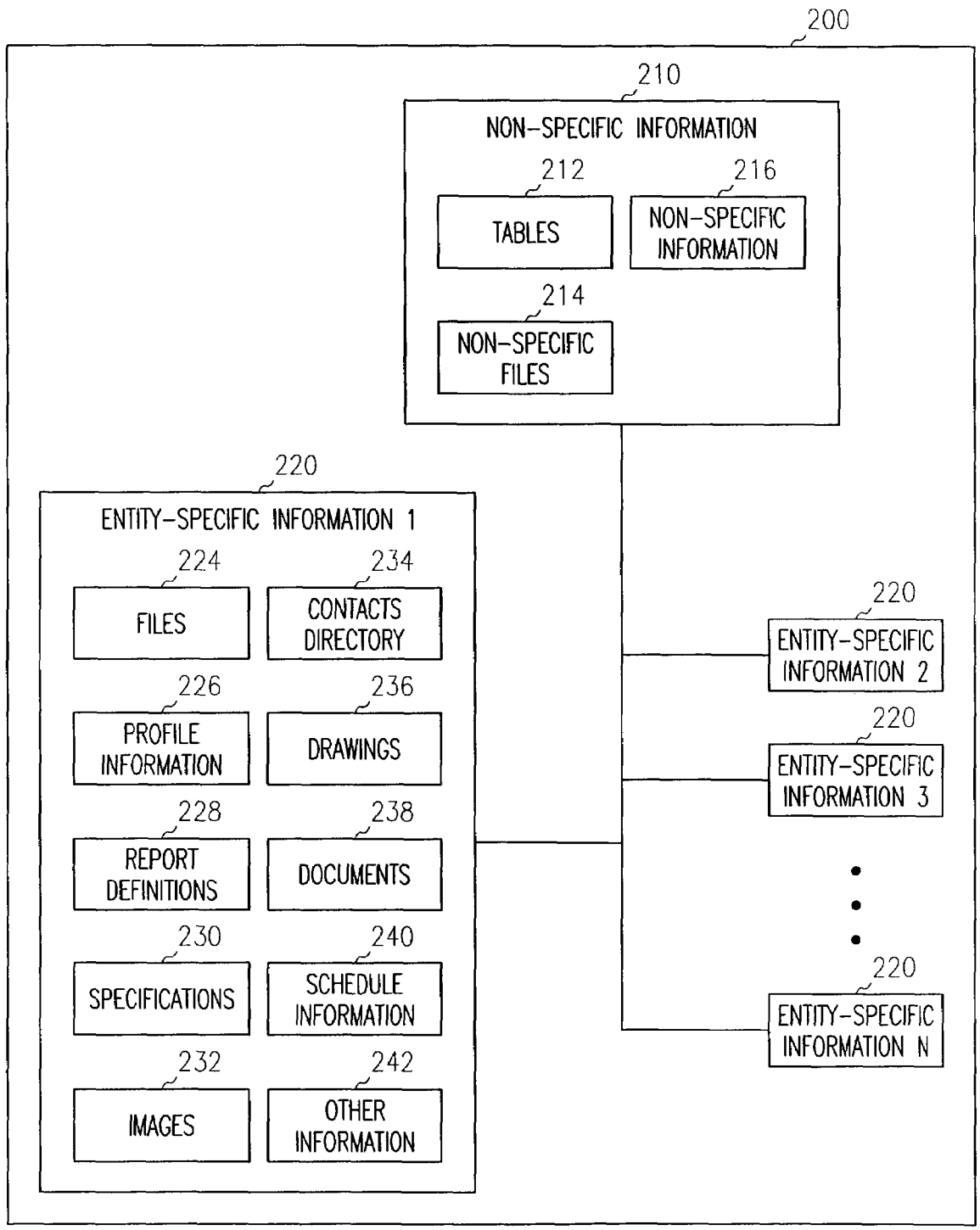
FIG. 2 illustrates a simplified representation of a collection of non-specific and specific information associated with a business unit in accordance with one embodiment of the present invention.

FIG. 2 illustrates a simplified representation of a collection 200 of non-specific information 210 and entity-specific information 220 associated with a business unit in accordance with one embodiment of the present invention. A "business unit" is an entity, such as an individual or company, for which a collection of information is managed by the system in accordance with various embodiments. For any particular business unit, information for one or more "manageable entities" could be managed by the system. A manageable entity is any entity or activity that has an associated set of entity-specific information. For example, but not by way of limitation, a manageable entity could be a construction project, a real estate management program, a human resources hiring program, an inventory tracking process, a referral service, a database, or any of an infinite variety of other entities or activities.

"Non-specific information" 210 refers to a set of electronically-stored information that can pertain to one or multiple manageable entities within a business unit. For example, but not by way of limitation, a non-specific information set could include form tables and other tables 212, non-specific files 214, and other information 216, including form definitions, data, scripts, files, contact information, and personal information. In contrast, "entity-specific information" 220 refers to a set of electronically-stored information that pertains to a specific manageable entity. For example, but not by way of limitation, an entity-specific information set could include entity-specific files 224, profile information 226, report definitions 228, specifications 230, images 232, contacts directories 234, drawings 236, documents 238, schedule information 240, and other information 242, including data, scripts, personal information, and presentations. Many of these types of information will be described further, below.

For the purposes of this description, an example business unit will be a company named "Acme Builders," and three manageable entities will be associated with the company, respectively named "Coffetyme Tenant Improvement (TI)," "Grayson Residence," and "Phipps Remodel." In this example, three sets of entity-specific information 220, one for each manageable entity, would be stored in the information collection 200 for Acme Builders. In addition, one or more sets of non-specific information 210 would be stored for Acme Builders, which could pertain to some, all, or none of the manageable entities.

As is the case for many different types of manageable entities, it would be desirable for multiple individuals to be able to access the non-specific information 210 and/or the entity-specific information 220 for Acme Builders. Individuals who may desire access could be, for example, Acme Builders employees, architects, owners, contractors, sub-contractors, information managers, administrators, inspectors, and various other types of individuals. An individual who attempts to access information is referred to generally as a "user."

Each user may have different privileges with respect to the information. For example, some users may have the privilege only to view information, while others have the privilege to create, modify, and store information. In addition, a user may be limited in the information that he or she is allowed to view or manipulate. For example, a user associated with Acme Builders may not be allowed to view or manipulate information pertaining to a different business unit. That user also may be allowed to view or manipulate information for only a single manageable entity (e.g., Coffetyme TI), but may be precluded from viewing or manipulating information for a different manageable entity (e.g., Phipps Remodel).

Figure 3:
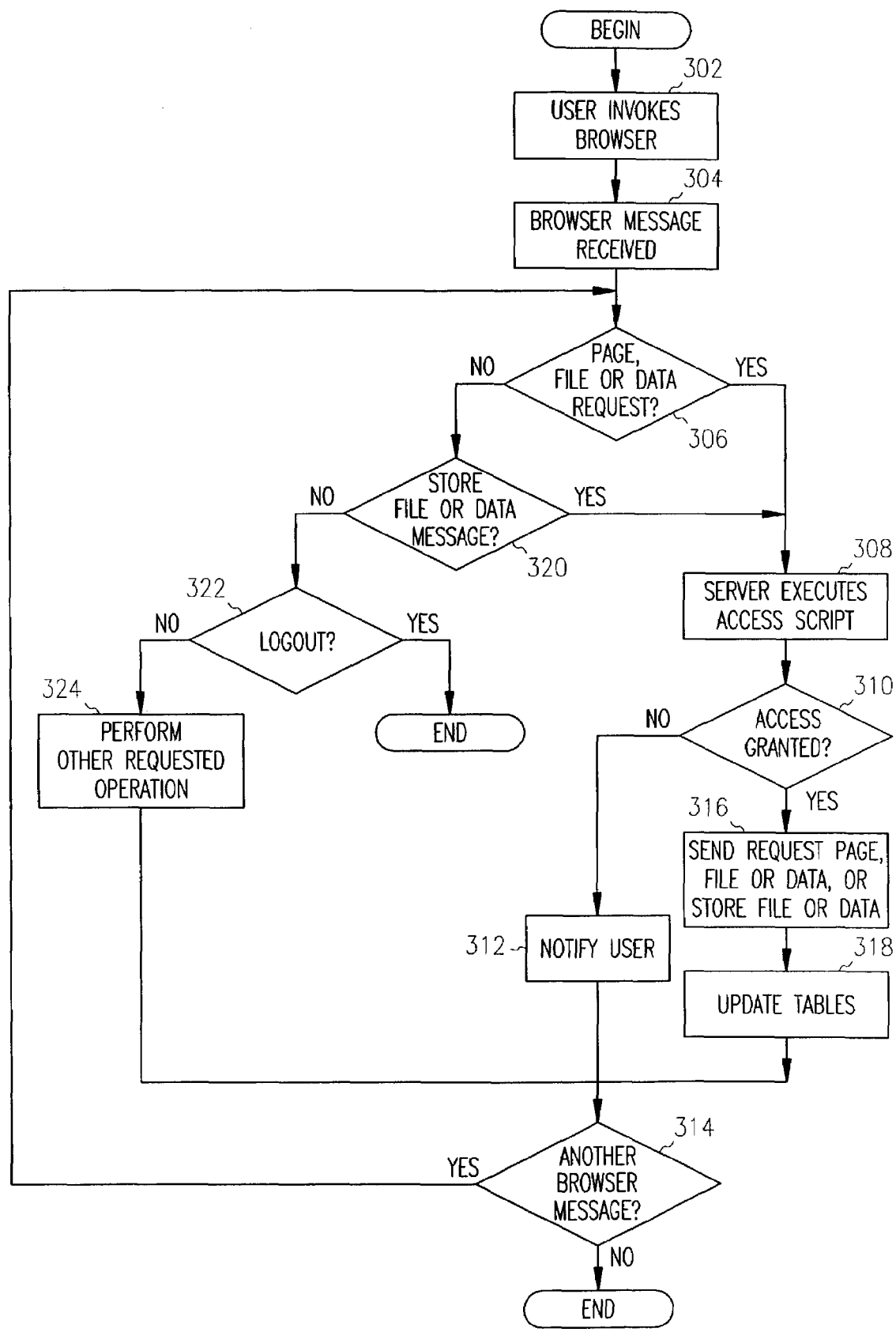
FIG. 3 illustrates a flowchart of a method for accessing and storing information in accordance with one embodiment of the present invention.

FIG. 3 illustrates a flowchart of a method for accessing and storing information in accordance with one embodiment of the present invention. The various processing blocks shown in FIG. 3 could occur on a client computer (e.g., client 102, FIG. 1), a server computer (e.g., server 104, FIG. 1), or both.

The method begins, in block 302, when a user invokes a browser or other network access software tool on the user's client computer (e.g., client 102, FIG. 1). Typically, this results in a "window" being displayed on the client computer's monitor. Using various user interface devices (e.g., keyboard, mouse, etc.), the user can interact with various fields of the window and cause messages to be sent from the client computer to the server. For example, a user can type a web address into a text field and click a "go" icon to cause the client computer to sent a page request to a server.

In block 304, a server computer receives a browser message. For example, a browser message could be a page request, a file request, a data request, a request to store a file or data, or a request to logout, for example.

The server determines, in block 306, whether the browser message is a request for information, such as a page, file, or data. If so, then the server executes an access script, in block 308, in order to determine whether or not the user has the appropriate privileges to receive the requested information.

In one embodiment, access is granted or denied as follows. First, the server checks a list, referred to herein as a "Master List," to determine whether the user is already logged into the system and is involved in an active session. In one embodiment, the Master List is stored in the non-specific information (210, FIG. 2) portion of an information collection (e.g., collection 122, FIG. 1) for the business unit that the user is associated with.

FIG. 4 illustrates an example of a Master List table in accordance with one embodiment of the present invention. In one embodiment, the Master List table includes a User ID field 402, User Name field 404, Password field 406, User Level field 408, Logout field 410, and Session ID field 412. If a request message received from the client computer includes a User ID or User Name, then the server can access the appropriate record in the Master List table to determine whether or not the user is already involved in an active session. In one embodiment, this is done by evaluating the Session ID field 412 to determine if a valid session ID exists, and also by evaluating the Logout field 410 to determine whether the user had previously logged out or whether the user's previous session had timed out (e.g., the user was idle for longer than a certain timeout period).

If the request message does not include a User ID or User Name, or if the server is unable to find an entry for the user in the Master List table, then the server computer runs a login script. The login script causes a login page to be displayed on the client computer, which prompts the user for login information (e.g., User Name or User ID, and Password). The user would then enter the information, and the client computer browser would send a message including the information back to the server. If the Password is correct for the particular user, then the server can update the Master List table with a valid Session ID 412, and can indicate in the Logout field 410 that the user is logged in (e.g., with a timestamp, a flag, or some other indicator).

Referring back to FIG. 3, and assuming that an active session is in progress, the server determines whether the user has access to the requested information (i.e., the information requested in block 304). In one embodiment, the server evaluates the User Level field 408 (FIG. 4) for the particular user, to determine the user's access level. In one embodiment, a hierarchical system of access can be used, where the lowest level has minimal access and the highest level has complete access to information. For example, a system could use the following access designations: Low, Medium, High, and Administrator, where a user having Administrator access can access any information in the system. In another embodiment, user access may be based on whether or not the user is a member of an appropriate user group, rather than using a hierarchical system.

After identifying the User Level, then in one embodiment, the server evaluates the type of request to determine whether or not the server can give someone with the user's access level the requested information. In one embodiment, this involves the server evaluating an Access Settings table, which is also stored as part of the non-specific information 210 (FIG. 2) for a particular business unit.

FIG. 5 illustrates an example of an Access Settings table in accordance with one embodiment of the present invention. In one embodiment, the Access Settings table includes a Request Type field 502, and User Level field 504. Various types of requests could be made, as indicated by the entries in the Request Type field 502. For example, a user may want to view a portal page, view a project, view a form, create a form, edit a form, or delete a form. Each of these types of actions is described in detail later.

Referring again to FIG. 3, an example is given as follows. Assume a user wants to view a portal page for a particular business unit. The user would input the portal page's web address into the browser window, and the client computer would send a request for the portal page to the appropriate server. The server would receive the request in block 304, determine that the request is a request for a page, in block 306, and execute the access script in block 308. If the request did not contain a User ID or User Name, the server would cause the user's browser to display a login page, and the user would enter his or her User Name (or User ID) and Password. Assuming the User Name is "Doug Sir" and the password is correct, the server would determine, from the Master List table (FIG. 4), that Doug Sir has a "High" user level. The server would then determine, from the Access Settings table (FIG. 5), whether a "High" user level is sufficient for a user to view a portal page (the user's initial request). As FIG. 5 indicates, any user with a "Low" or better User Level may view a portal page. Therefore, in block 310, FIG. 3, the server would determine that access is granted.

In a situation where access is not granted for some reason (e.g., wrong User Name, Password or User Level), then the server sends a message back to the client computer, in block 312, to notify the user that access is denied. The server then waits for another browser message, in block 314. If none is received within an appropriate timeout period, then the session is ended and the method ends. Otherwise, the method iterates as shown.

If access is granted in block 310, then the server obtains the requested page, file or data, and sends the information back to the client computer, in block 316. In block 318, the server may then update one or more tables (e.g., the Master List table, FIG. 4, or other tables as will be described later), and waits for another browser message in block 314.

Referring back to block 306, if the received request is not a page, file or data request, then a determination is made, in block 320, whether the browser message includes a request to store a file or data (e.g., a form, image, schedule information, etc.). For example, a message may request that a new form (described later) should be stored in the entity-specific information (220, FIG. 2) for a particular project and a particular business unit. As another example, a message may request that certain data (e.g., dates, numbers, or other information) be stored in the non-specific (210, FIG. 2) or entity-specific information. If such a request is received, then again, the server executes the access script, in block 308, to determine whether or not the particular user has the appropriate permissions to perform such a task. Assuming that the user does, then the server stores the file or data, in block 316, and updates various tables, if necessary, in block 318. Updating tables for stored information will be described in more detail later. The method then iterates as previously described.

Referring again to block 320, if the message does not include a request to store a file or data, then a determination is made whether the request is a request to logout, in block 322. If so, the method ends. If not, then it is assumed that the request is some other type of request, and the server performs that other requested operation in block 324. The method then iterates as shown.

As described above, a user may be able to access and manipulate information pertaining to one or more business units, and one or more manageable entities for a particular business unit. A user may navigate through a series of web pages in order to identify and access particular information. Alternatively, a user may enter a specific web page identifier in order to go directly to a page that contains information the user desires. For illustration purposes, an example is described below, where a user begins the process of navigating through information pertaining to a particular business unit by first accessing a high-level "Portal Page" for a business unit. From that page, the user can then click on various links to get to a particular "Project Page," which is a page that includes information pertaining to a specific manageable entity. In one embodiment, some of this information includes forms, which are used to input project information and/or retrieve project information. In one embodiment, users with appropriate permissions may create, edit, or view these forms. For the purposes of brevity, the description below does not specify the access processes that occur for each browser request. It is assumed that access is granted to the various pages and tools, described below, or that a login process would be conducted.

The ability to create, edit, and view forms represents a significant advantage of the embodiments of the present invention over prior art systems. In one embodiment, a user interacts with an easy-to-use, window driven interface in order to perform these tasks. Therefore, a user is able to customize the way that information is input into the system and retrieved from the system without requiring skilled programmers and without being constrained by pre-generated information storage and retrieval forms that come with an off-the-shelf software product. These advantages are made apparent in the example figures that follow, which show example web pages displayed at a client computer while a user navigates through information for a particular business unit and the manageable entities associated with that business unit.

Figure 6:
FIG. 6 illustrates an example of a Portal Page in accordance with one embodiment of the present invention.

In some cases, a user may begin to view project information by first requesting the "Portal Page" for a business unit. FIG. 6 illustrates an example of a Portal Page for Acme Builders in accordance with one embodiment of the present invention. In one embodiment, the server causes the Portal Page to be displayed by a client computer by executing a script, which retrieves and outputs various files and HTML elements. In another embodiment, the Portal Page could be an HTML document that is sent to the client computer by the server.

In one embodiment, a Portal Page includes a header 602 that may identify the business entity (e.g., "Acme Builders") and display non-specific information, such as the business entity's address, telephone number, and logo. The Portal Page also could include one or more fields 604 with other information, such as corporate notices, press releases, links to other sites, static or dynamic text or images, and a wide variety of other types of information.

In one embodiment, the Portal Page includes a set of links 606, which enable a user to access other non-specific or entity-specific information. For example, the "Edit My Info" link 610 may enable a user to edit the user's contact, login, or other information. The "Admin Area" link 612 may enable an administrator for the business unit to create or delete projects, modify access privileges, edit the Portal Page and other pages, and perform other administration tasks. The "Contact Directory" link 614 may enable a contact directory for the business unit to be executed or displayed. The "Online Help" link 618 may enable a user to access a help utility for using the site.

Finally, the "List Projects" link 616, when selected, enables a user to navigate toward a particular project that the user is interested in. In one embodiment, when the List Projects link 616 is selected, a "Project List Filter" page is displayed by the browser. In another embodiment, the Project List Filter page is bypassed, and a Project List page is displayed, which will be described in more detail in conjunction with FIG. 8.

Figure 7:
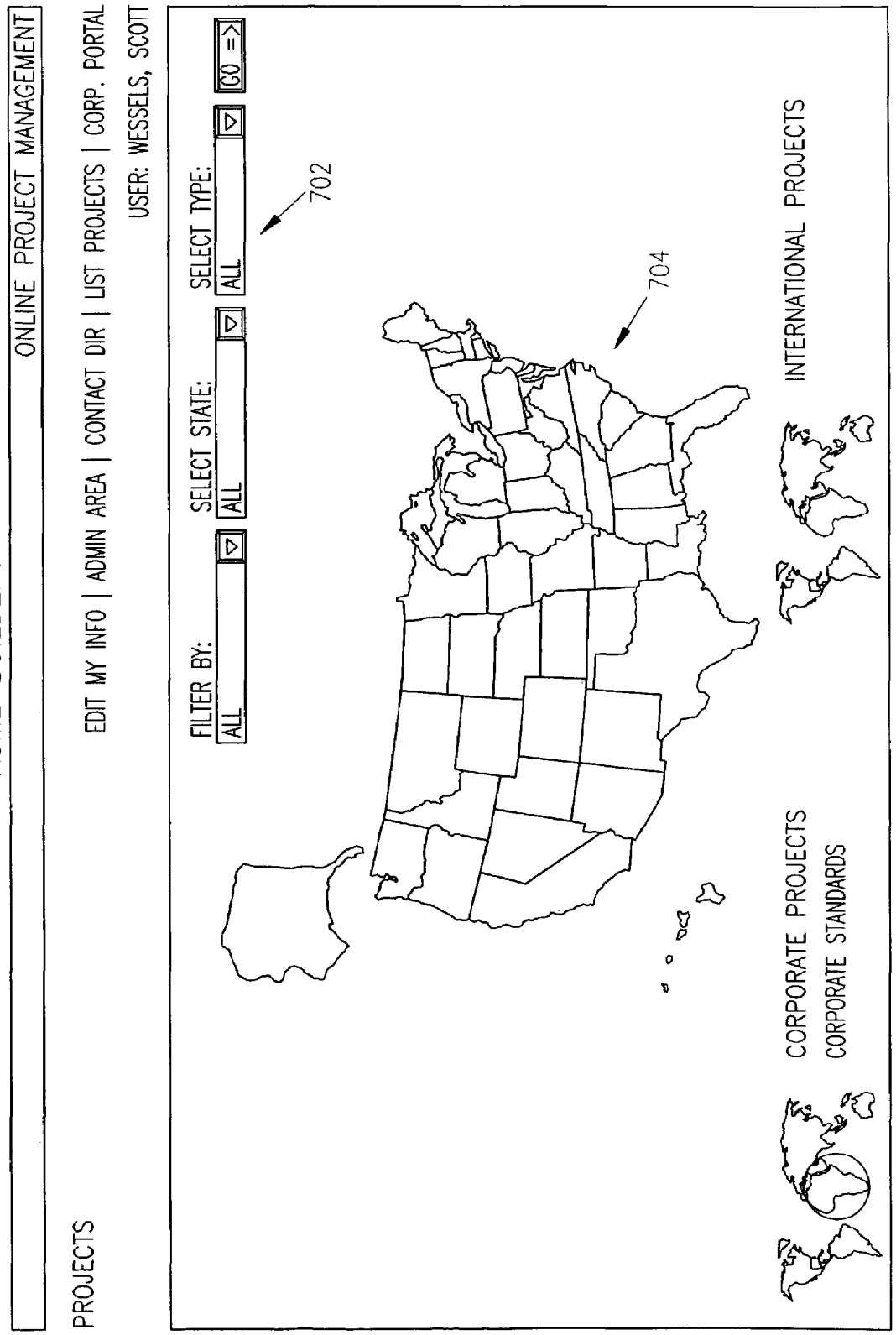
FIG. 7 illustrates an example of a Project List Filter page in accordance with one embodiment of the present invention.

FIG. 7 illustrates an example of a Project List Filter page in accordance with one embodiment of the present invention. The Project List Filter page is intended to enable a user to narrow down the list of projects that the user is interested in viewing. For example, a particular business unit may have thousands of projects across the country, and a user may be interested in projects of only a certain type or that exist only within a certain region (e.g., a state). Many different ways of filtering projects could be used. For illustration purposes only, a geographical filter is described here.

In one embodiment, the Project List Filter page includes one or more selectable filter elements 702, which enable a user to indicate how the filter should be applied (e.g., filter by name), a geographical region, and/or the type of filter to use. When a filter element is identified and the user selects "Go," then the filter is applied and a list of projects will be displayed, as is described below. The Project List Filter page also or alternatively can include one or more other types of text-based or graphical filter selection element, such as a map 704, which enables a user to click on a particular region (e.g., a state) to initiate the project filter.

In one embodiment, execution of a filter results in the server obtaining project related information in accordance with the filter criteria, and causing the browser to display a Project List page with that information. The project related information is stored in various tables (212, FIG. 2) within the non-specific information (210, FIG. 2) for the particular business unit. The contents and use of these tables are described in more detail later.

FIG. 8 illustrates an example of a Project List page in accordance with one embodiment of the present invention. Among other things, the Project List page includes a list 802 of projects that met the filter criteria, if any, specified by the user. In the example list, three projects were found: "Coffeetyme TI," "Grayson Residence," and "Phipps Remodel." Along with each project name, additional information for each project may be displayed. For example, for each project, a Project ID, Manager name, Address, and Project Type can be displayed. As will be described in more detail later, some or all of this information can be stored in and retrieved from a "Project Profile" table stored in the non-specific or entity-specific information (210, 220, FIG. 2) for the business unit. When a user selects one of the listed projects, then the server causes the browser to display a "Project Home" page for the selected project, in one embodiment.

FIG. 9 illustrates an example of a Project Home page in accordance with one embodiment of the present invention. In one embodiment, a Project Home page includes a set of elements 902 that include the project name and other project information, such as the project manager, project director, project ID number, and project address, for example. As will be described more fully below, this information can be extracted by the server from one or more tables stored in the information collection (200, FIG. 2) for a particular business unit.

In addition, in one embodiment, a Project Home page can include selectable links to other project information 904, links to various files 906, and links to one or more tools 908, which will be described in more detail later. In one embodiment, when a user selects a link within the project information set of links 904, the server requests more information from the user to identify the desired information, if necessary, and accesses the requested information. In many cases, the information will be retrieved by the server from entity-specific information (220, FIG. 2) stored for the particular manageable entity. For example, if a user selects "Project Schedule," the server would access schedule information (240, FIG. 2) from the entity-specific information (220, FIG. 2) for the project, and would cause the browser to display the schedule (assuming there is only one). As another example, if a user selects "Image Center," the server would cause the browser to display a list of available images for the user to select from. The user could then make his or her selection, and the server would access images (232, FIG. 2) from the entity-specific information for the project, and cause the browser to display the selected imaged.

In one embodiment, when a user selects a link within the files set of links 906, the server may cause the browser to display a utility that enables the user to access existing files or forms or to create new files or forms. For example, if the user selects "Confidential Documents," the server will cause the browser to display a page with a list of confidential documents associated with the project from which the user may select a document to view. As another example, if the user selects "Request For Information" (RFI), the server will cause the browser to display a page listing one or more existing RFIs, and that enables the user to create a new RFI.

Finally, if a user selects a tool from the set of tools links 908, the server executes a script that enables the selected tool to execute. In the example page shown, three tools are listed: Forms, Reports, and Presentations. As will be described in great detail later, these tools enable users to create custom applications and custom ways of accessing and storing entity-specific or non-specific information. Before describing these tools, FIGS. 10-12 and the description below describe how a new project is created, and how project information is stored, in accordance with one embodiment of the present invention.

Figure 10:
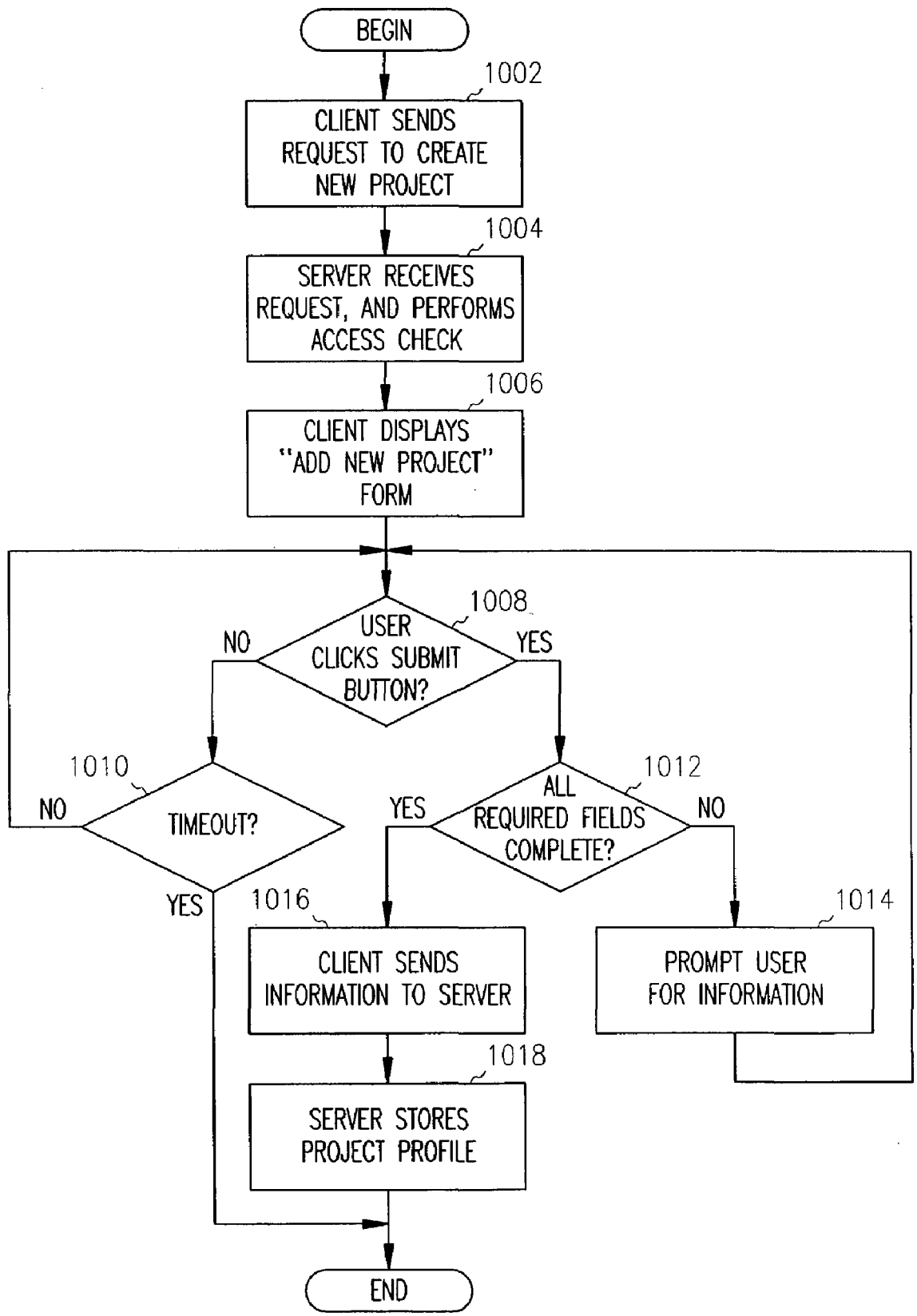
FIG. 10 illustrates a flowchart of a method for creating a new project in accordance with one embodiment of the present invention.

FIG. 10 illustrates a flowchart of a method for creating a new project in accordance with one embodiment of the present invention. In one embodiment, the ability to create a new project is given only to users with a particular access level. For example, only users with an "Administrator" user level may be able to create new projects. In other embodiments, users with different levels may be able to create projects.

In one embodiment, a user accesses project creation capabilities through the "Admin Area" of a business unit's website. For example, referring back to FIG. 6, if a user selects the "Admin Area" link 612, a page could be displayed that enables the user, assuming he or she has appropriate permissions, to create or delete projects, modify access privileges, edit the Portal Page and other pages, and perform other administration tasks.

The method of FIG. 10 is initiated, in block 1002, when a client sends a request to the server, indicating that a user wants to create a new project. The server receives the request, in block 1004, and executes the access script to determine whether or not the user has the appropriate privileges. Assuming the user does have the appropriate permissions, then in block 1006, the server causes the browser to display an "Add New Project" form, into which the user will enter entity-specific information.

FIG. 11 illustrates an example of an Add New Project form in accordance with one embodiment of the present invention. The form can include any of a variety of form elements, which enable project profile information to be specified by a user. In one embodiment, the form includes various text input fields 1102, drop-down selection boxes 1104, and buttons 1106 that implement code, when selected. For example, the project profile information could include a project name, project manager, project director, project number, project type, project description, an identifier of an image to display on the project home page, and project address, among other things. In addition, the Add New Project form includes a "Submit" button 1108.

Referring back to FIG. 10, a determination is made whether the user has selected the "Submit" button, in block 1008. If the user has not clicked the "Submit" button within a timeout, as determined in block 1010, then the procedure ends. Otherwise, the system waits for the user to click the "Submit" button. Once the "Submit" button is selected, the server determines whether all required fields have been completed, in block 1012. If not, then the client prompts the user for the required information, in block 1014, and the procedure iterates.

If all required fields have been completed, then the client sends the project profile information to the server, in block 1016. In another embodiment, the client can send project profile information to the server whenever it is entered into a form element.

The server causes a new project to be created within the system by storing the project profile information, in block 1018, and the method ends. In one embodiment, project profile information is stored in a "Project Profile" table as part of the non-specific information (210, FIG. 2) for a business unit. Each project has an entry in the Project Profile table, and when a new project is created, a new entry is added to the table.

FIG. 12 illustrates an example of a Project Profile table in accordance with one embodiment of the present invention. In one embodiment, the Project Profile table includes a Project ID field 1202, Project Name field 1204, one or more address fields 1206, 1208, Manager Name field 1210, Director Name field 1212, and Project Type field 1214. In one embodiment, the Project ID field 1202 includes a unique project number for every project being managed for the business unit. In one embodiment, when a new project is created, a unique project ID is selected by the system for the new project. The Project Name field 1204 includes other identifiers for the projects, but the names need not be unique. In one embodiment, multiple address fields 1206, 1208 are implemented so that filtering processes can more easily identify projects based on geographical criteria. The Manager Name field 1210 and Director Name field 1212 include the names of individuals who are designated as the manager and director, respectively, for a project. Finally, the Project Type field 1214 includes a description of the type of project the entry corresponds to. For example, a project type could be a minor tenant improvement, a home remodel, an invoice creation process, a worker pool management process, a real estate project, or any of a nearly infinite variety of other types of projects or manageable entities. The project type could be identified with a text identifier, or with a number or other identifier that designates a particular project type.

After a project is created, it is possible to view a Project Home page (e.g., FIG. 9) and access various project data. In one embodiment, non-specific and entity-specific information can be accessed or manipulated by using user-customizable forms. Referring back to FIG. 9, which is an example of a Project Home page, it is possible for a user to view, create, and edit forms by selecting the "Forms" tool from the list of Tools links 908. When the Forms tool is selected, the server causes the browser to display a "Form List" page, in one embodiment.

Figure 13:
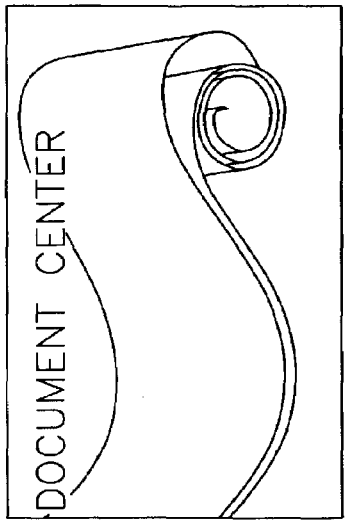
FIG. 13 illustrates an example of a Form List page in accordance with one embodiment of the present invention.

FIG. 13 illustrates an example of a Form List page in accordance with one embodiment of the present invention. The Form List page can include an "Edit Forms" link 1302, and a list 1304 of previously-created forms. Some of these previously-created forms can be static forms, which are forms for which only one version exists. For example, a static form might be a "Project Team" form, which includes a list of project members. When a user selects a static form, the form is displayed, along with all information associated with the form. Other forms can be "logged" forms, which are forms for which multiple versions, or "posts," could exist. For example, a set of logged forms could be a set of "Contractor Payment Records," where a separate post exists for each contractor payment. When a user selects a logged form, the server causes the browser to display a list of all logged posts for the form.

FIG. 14 illustrates an example of a list of logged posts in accordance with one embodiment of the present invention. The example lists a sequence 1402 of four logged Contractor Payment Record posts. For each post, various information can be displayed. For example, each post may have a unique tracking number. In addition, a summary of specific information within the post can be displayed. In the given example, each post entry includes a check received date, check number, check amount, and project name. For other types of forms, other information could be displayed.

If a user selects one of the posts, then the server will cause the browser to display a logged post entry corresponding to the selection. FIG. 15 illustrates an example of a logged post entry in accordance with one embodiment of the present invention, where the entry corresponds to the user having selected the first Contractor Payment Record post in the list of posts from FIG. 14.

In one embodiment, the entry includes a text representation of information specific to that entry. In the given example, the entry includes all information pertaining to a payment from "S Construction", received on Sep. 22, 2000, in the amount of $1,200.00. In addition, in one embodiment, the entry includes a "Created" field 1502, which indicates the date and time when the post was created, and a "Last Modified" field 1504, which indicates the date and time when the post was last modified.

Referring back to FIG. 14, a user can select "Post New" 1404 from a set of selectable links, in order to create a new post, which will be added to the list 1402. In one embodiment, when the user selects "Post New," the server causes the browser to display a blank form of the type corresponding to the list of logged posts. Thus, in the given example, when the user selects "Post New" 1404, the server causes the browser to display a blank "Contractor Payment Records" form. In one embodiment, the server obtains the form definition (i.e., the content and layout of the form) from a "Form List" table, which is stored as part of a business unit's information collection (200, FIG. 2). The "Form List" table will be described in more detail later.

FIG. 16 illustrates an example of a new post form in accordance with one embodiment of the present invention. The form includes a text field 1602 with the form name, and a tracking number 1606, which is assigned by the system, in one embodiment. The tracking number could be the next sequential number after the tracking numbers assigned to previously-created posts, in one embodiment. In addition, the form includes one or more form elements 1608, which the user can manipulate to specify information. Finally, the form includes a "Submit" button 1610 and a "Cancel" button 1612. If the user selects the "Cancel" button 1612, then a new logged post will not be created. If the user selects the "Submit" button 1610, then the server will cause a new logged post to be created by adding an entry to the "Form List" table.

Figure 17:
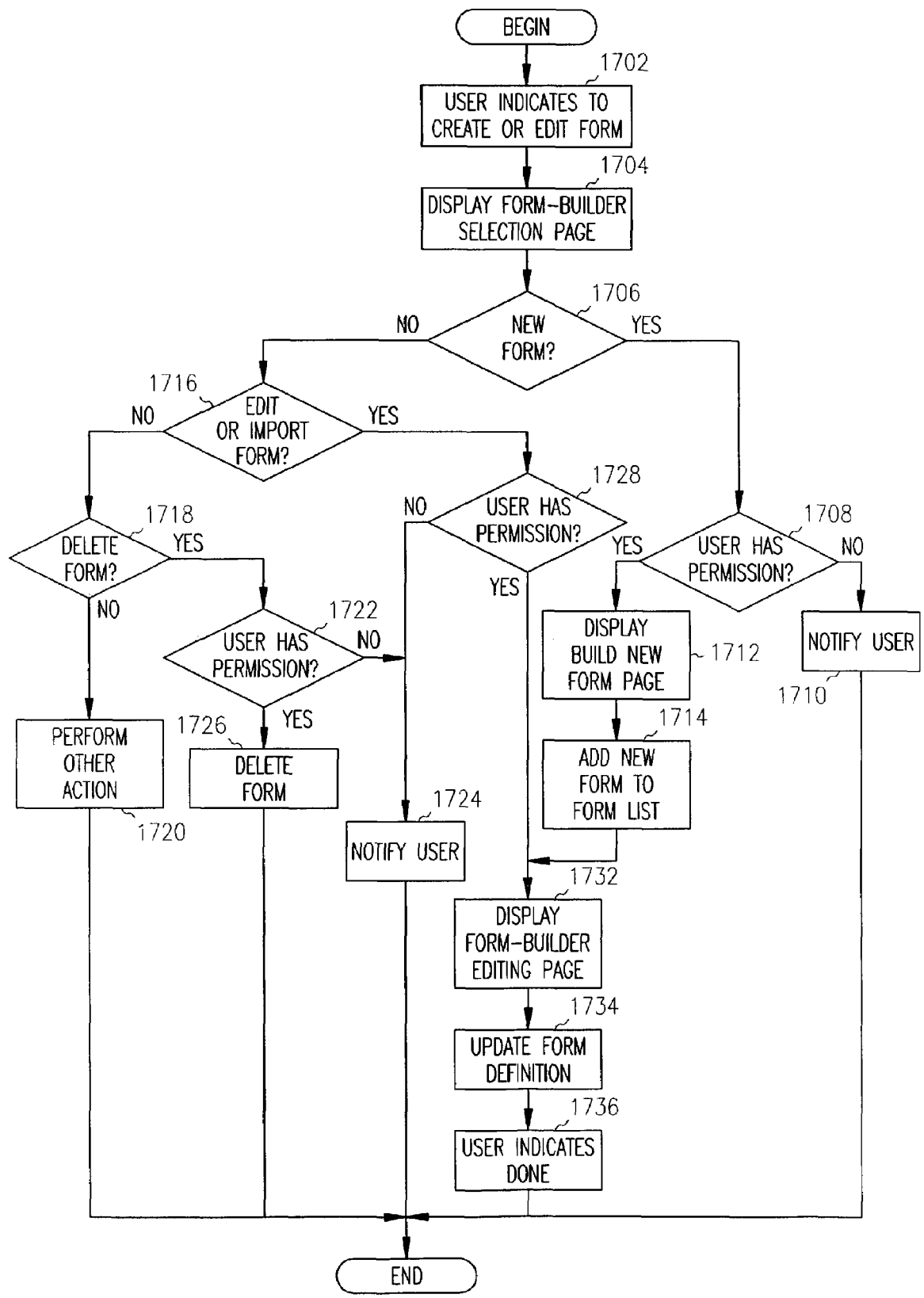
FIG. 17 illustrates a flowchart of a method for creating or editing a form in accordance with one embodiment of the present invention.

FIG. 17 illustrates a flowchart of a method for creating or editing a form in accordance with one embodiment of the present invention. The method begins, in block 1702, when a user indicates that he or she wants to create or edit a form. For example, one way to indicate that a user wants to create or edit a form is when the user selects the "Edit Forms" option 1302 (FIG. 13) on a Form List page.

The server then causes the browser to display a "Form-Builder Selection" page, in block 1704. In one embodiment, this page enables the user to use or edit a currently-existing form, to delete a form, to create a new form, or to import a form to use as a template for a new form.

FIG. 18 illustrates an example of a Form-Builder Selection page in accordance with one embodiment of the present invention. The Form-Builder Selection page includes a field 1802 that lists currently-existing forms, and a set of buttons 1804, 1806, 1808, 1810, 1812, which enable the user to indicate an action to take with respect to a form.

If a user highlights a form name in the form list 1802 and then clicks on the "Use" button 1804, the server will retrieve the definition information for that form from the Form List table (FIG. 21), and will cause the browser to display the form. The user can then interact with the form and submit it. This will result in the server modifying tables that include the values of the various form elements. In this manner, the user is able to input information into the database.

If a user highlights a form name in the form list 1802, and then clicks on the "Edit" button 1806, the server will cause the browser to display a Form Editing page, which will be described in more detail in conjunction with FIG. 20. The Form Editing page will include a representation of all of the form elements of the highlighted form.

If the user highlights a form name in the form list 1802, and then clicks on the "Delete" button 1808, then the server will perform a sequence of verifications (e.g., poll the user to indicate whether the user is sure he or she wants to delete the form), and will remove the form from the system. If the form is a logged form, the server will poll the user to indicate which post (or posts) the user wants to delete. In one embodiment, deletion of a form involves removing the associated entry for the form from the Form List table, described later.

If the user clicks on the "New" button 1810, then the server will cause the browser to display a "Build New Form" page, with which the user can initialize the new form with the system. When that is done, the server will cause the browser to display the Form Editing page, which will be described in more detail in conjunction with FIG. 20. Finally, if the user highlights a currently-existing form from the form list 1802 and clicks on the "Import" button 1812, then the server will also cause the browser to display the Form Editing page. In this case, The Form Editing page will include a representation of all of the form elements of the highlighted form.

Referring back to FIG. 17, a determination is made, in block 1706, whether the user has indicated that he or she wants to create a new form. If so, then the server determines whether or not the user has the appropriate permissions to perform that action, in block 1708. If not, the user is so notified, in block 1710, and the method ends. If so, then the server causes the browser to display a "Build New Form" page, in block 1712.

FIG. 19 illustrates an example of a "Build New Form" page in accordance with one embodiment of the present invention. In one embodiment, the page includes a Form Name field 1902, within which the user can specify a name for the new form. In addition, the page includes a drop down menu 1904, in one embodiment, with which the user can specify whether the form is a static form, a logged form, or some other type of form. In one embodiment, the user is also able to specify, in field 1906, the availability and scope of the form. For example, if the user indicates that the form pertains to "This Project Only," then the form will only be viewable or editable when a user has selected the current project. If the user indicates that the form pertains to "All Projects Combined," then the form will be viewable or editable when the user has selected any project of the business unit. Alternatively, the user can indicate that the form pertains to "All Projects Unique."

In one embodiment, a user is also able to specify, in field 1908, that the user wants to copy the layout of the form elements of a currently-existing form in the new form. The user is able to select the currently-existing form from a drop down menu of forms, in one embodiment.

When the user is satisfied with the entries in the various fields, the user can select the "Create" button 1910. Referring back to FIG. 17, this causes the server to add a new entry to the Form List table, in block 1714, which pertains to the new form. The Form List table is described in more detail in conjunction with FIG. 21. The method then enables the user to edit the form in block 1732, described later.

Referring back to block 1706, if the user has not indicated that he or she wants to create a new form, a determination is made, in block 1716, whether the user wants to edit a currently-existing form or import a form. If not, then a determination is made, in block 1718, whether the user has indicated that he or she wants to delete a currently-existing form. If not, then it is assumed that the user has made some other request, the server performs the requested action, in block 1720, and the method ends. If the user has indicated that he or she wants to delete a form, then the server determines whether or not the user has the appropriate permissions to perform that action, in block 1722. If not, the user is so notified, in block 1724, and the method ends. If so, then the server causes the entry in the Form List corresponding to the selected form to be deleted, in block 1726, and the method ends.

Referring back to block 1716, if the user has indicated that he or she wants to edit or import a form, then the server determines whether or not the user has the appropriate permissions to perform the requested action, in block 1728. If the user does not have the appropriate permissions, the user is so notified, in block 1724, and the method ends. If so, then the server causes the browser to display the Form-Builder Editing page, in block 1732.

In one embodiment, each time the user makes a change to the form (e.g., adds or deletes an element, or edits the form or element properties), the server updates the form definition in the Form List table, in block 1734. This process continues until the user indicates that he or she is done editing the form, in block 1736. Once that occurs, the method ends.

Figure 20:
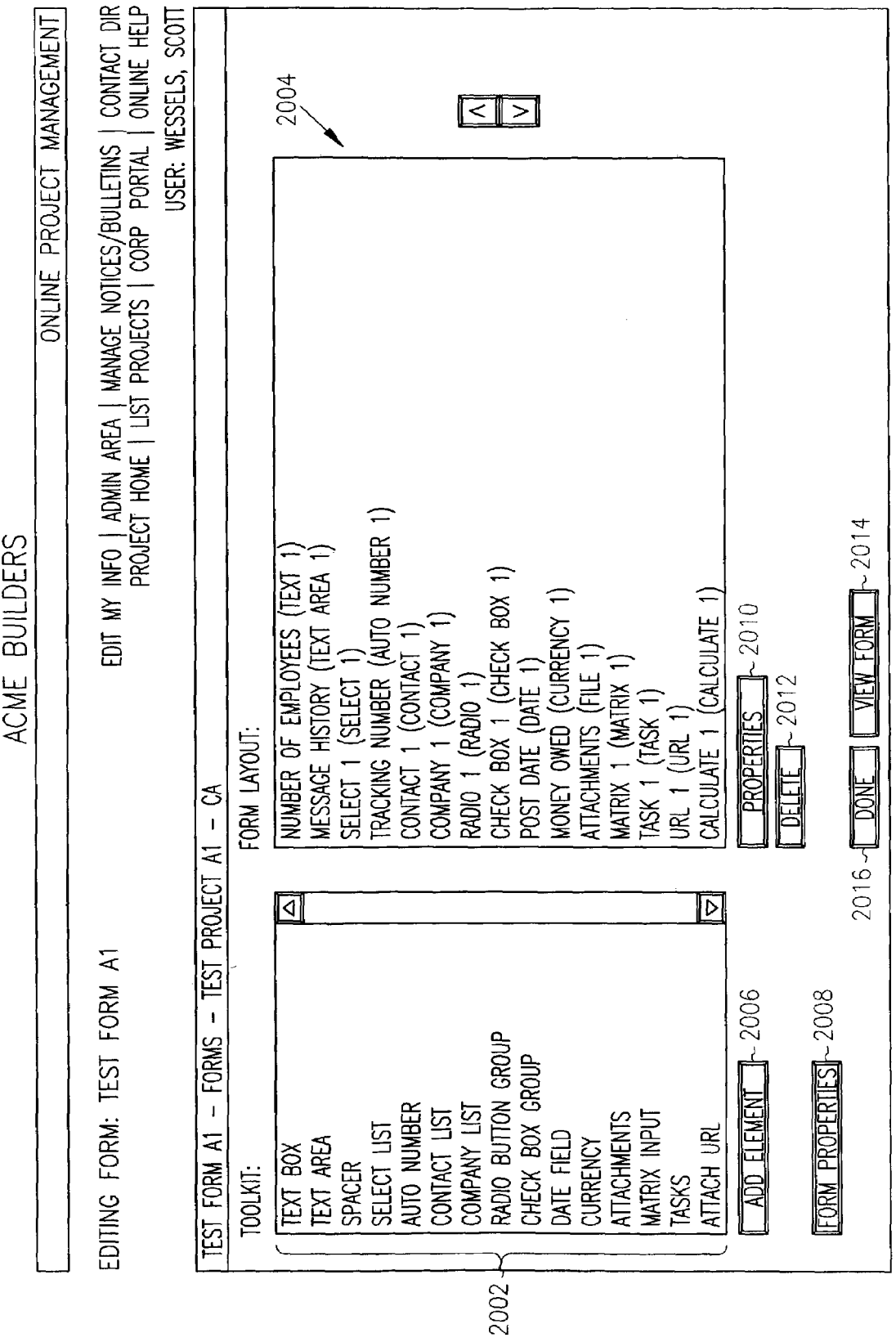
FIG. 20 illustrates an example of a Form-Builder Editing page in accordance with one embodiment of the present invention.

FIG. 20 illustrates an example of a Form-Builder Editing page in accordance with one embodiment of the present invention. In one embodiment, the Form-Builder Editing page includes a selectable list 2002 of form elements, and a form layout space 2004. The form layout space 2004 displays all of the form elements that are included on the particular form being edited. When a user wants to add a form element to the page, the user drags the element name from the form element list 2002 into the form layout space 2004, in one embodiment. Alternatively, the user can highlight the form element that the user wants to add within the form element list 2002, and select the "Add Element" button 2006.

In one embodiment, when the user has indicated that he or she wants to create a new page, the form layout space 2004 is blank when the page is first displayed. If the user has indicated that he or she wants to edit or import a currently-existing form, then the form layout space 2004 includes a listing of all form elements for the currently-existing form when the page is first displayed.

The page also includes a selectable "Form Properties" button 2008, in one embodiment. When the "Form Properties" button is selected, the server causes the browser to display a "Form Properties Specification" page, in one embodiment, which enables the user to specify overall properties of the form being created. These form properties can include, for example, the form name, sizes of various fields within the form, information on whether and how the form may be distributed when it is filled out (e.g., when a new post is created using the form), information on who has permissions to edit, view, delete, or otherwise access the form, and password information, among other things.

The Form-Builder Editing page also includes a selectable "Element Properties" button 2010, in one embodiment. When a form element is highlighted within the form layout space 2004, and the "Element Properties" button 2010 is selected, the server causes the browser to display an "Element Properties" page, in one embodiment, which is appropriate for the particular type of selected form element. For example, form element properties could include an element label, element size information, default values, menu items, data, formulas, and any of a number of different possible element properties. When the user specifies particular element properties, the user controls how that element will appear and behave when it is incorporated into the form.

The Form-Builder Editing page also includes a selectable "Delete" button 2012, in one embodiment. When a form element is highlighted within the form layout space 2004, and the "Delete" button 2012 is selected, the form element will be removed from the form layout.

In one embodiment, the user can view the form as it is being created by selecting a "View Form" button 2014 on the page. When this is selected, the server causes the browser to display a page that shows what the form looks like.

When the user is finished creating or editing the form, the user can select the "Done" button 2016. In one embodiment, this causes the Form Editing page to disappear. At this point, the form definition in the Form List table is an accurate representation of the form.

FIG. 21 illustrates an example of a Form List table in accordance with one embodiment of the present invention. The Form List table is stored as part of the tables 212 (FIG. 2) within the non-specific information 210 (FIG. 2) for a particular business unit, in one embodiment.

The Form List table includes a Form ID field 2102, Form Name field 2104, Project ID field 2106, Form Type field 2108, and Definition field 2110, in one embodiment. The Form ID field 2102 includes a unique identifier for each form that exists for the business unit. The Form Name field 2104 includes a name, as specified by a user, and which is listed as the form name in the various pages described previously. The Project ID field 2106 indicates which project or projects the form pertains to. In one embodiment, if the Project ID field 2106 for a particular entry has a specific project number, then that form can be viewed, used, or edited only when a user is within that project. If the Project ID field 2106 has a value other than a specific project number, then that form can be viewed, used, or edited when the user is within other projects.

The Form Type field 2108 indicates whether the form is a static or a logged form, as specified by the user when the user created the form. Finally, the Definition field 2110 includes a compressed or uncompressed representation of the form properties, form elements, and element properties for the form. As described previously, each time the user modifies a property or element, the server updates the value in the Definition field 2110, in one embodiment. In another embodiment, all properties and elements can be stored by the client computer until the user clicks the "Done" button 2016 (FIG. 20), at which point the server updates the value in the Definition field 2110.

CONCLUSION

Various embodiments of systems and methods for managing information have been described. The various embodiments have numerous advantages over prior art methods and apparatus. For example, the methods of the various embodiments enable users associated with a business unit to create, edit, and use forms in order to access or input non-specific and entity-specific information. The methods and apparatus of the present invention provide numerous other advantages over the prior art, as well.

In the foregoing detailed description of the preferred embodiments, reference is made to the accompanying drawings, which form a part hereof, and in which are shown by way of illustration specific preferred embodiments in which the invention may be practiced. These embodiments are described in sufficient detail to enable those skilled in the art to practice the invention. It will be appreciated by those of ordinary skill in the art that any arrangement, which is calculated to achieve the same purpose, may be substituted for the specific embodiments shown.

This application is intended to cover various adaptations or variations of the present invention. The foregoing detailed description is, therefore, not to be taken in a limiting sense, and it will be readily understood by those skilled in the art that various other changes in the details, materials, and arrangements of the parts and steps, which have been described and illustrated in order to explain the nature of this invention, may be made without departing from the scope of the invention as expressed in the adjoining claims. Therefore, all such changes are intended to fall within the scope of the present invention.

What is claimed is:

1. A method for managing an electronically-stored, entity-specific information set associated with a manageable entity, the method comprising:

a server computer storing form definition information for a form, wherein the form includes one or more form elements, and wherein the form definition information defines the one or more form elements;

the server computer receiving one or more messages from a client computer indicating that a user of the client computer wants to edit the form;

the server computer executing one or more scripts, which interact with the client computer to enable the client computer to display a form-builder utility;

the client computer displaying the form-builder utility, which enables the user to edit the form by providing user inputs to the form-builder utility through a user interface, wherein the user inputs affect the one or more form elements included in the form;

the client computer sending information reflecting the user inputs to the server computer; and the server computer, in response to receiving the information reflecting the user inputs, updating the form definition information for the form.

2. The method of claim 1, further comprising:

the server computer determining, based on the one or more messages, whether the user wants to create a new form or edit an existing form using the form-builder utility;

if the user wants to create the new form, the server computer creating a new entry in a form list table, wherein the new entry includes a form identifier, which identifies the new form; and if the user wants to edit the existing form, the server computer determining the form identifier from the one or more messages to identify an existing entry in the form list table, retrieving the form definition information for the existing form based on the form identifier, and enabling the client computer to display the one or more form elements of the existing form based on the form definition information.

3. The method of claim 2, wherein creating the new entry includes the server computer storing a form name specified by the user, and an entity identifier, which associates the new form with one or more manageable entities.

4. The method of claim 2, further comprising:

if the user wants to create the new form, the server computer receiving an indication that the user wants to use imported form definition information from another form for the new form;

retrieving the imported form definition information associated with the another form;

associating the imported form definition information with the new entry; and enabling the client computer to display the one or more form elements of the new form based on the imported form definition information.

5. The method of claim 2, further comprising:

if the user wants to create the new form, the server computer interacting with the client computer to develop the form definition information, wherein the form definition information describes the one or more form elements, and the server computer associates the form definition information with the new entry in the form list table.

6. The method of claim 2, further comprising:

if the user wants to edit the existing form, the server computer interacting with the client computer to develop edited form definition information, wherein the edited form definition information describes the one or more form elements, and the server computer replaces previous form definition information associated with the existing entry in the form list table with the edited form definition information.

7. A method for managing an electronically-stored, entity-specific information set associated with a manageable entity, the method comprising:

a server computer storing form definition information for a form, wherein the form includes one or more form elements, and wherein the form definition information defines the one or more form elements, and wherein the form definition information is updatable by the server computer;

the server computer receiving one or more first messages from a client computer indicating that a user of the client computer wants the client computer to display the form;

the server computer executing one or more scripts that interact with the client computer to enable the client computer to display the form;

the client computer displaying the form, and enabling the user to provide user inputs to the form through a user interface, wherein the user inputs include information associated with the one or more form elements;

the client computer sending the information to the server computer; and the server computer storing the information, wherein the information is stored in relation to the form and the entity-specific information set.

8. The method of claim 7, further comprising the server computer:

receiving one or more second messages from the client computer indicating that the user wants a list of forms associated with the entity-specific information set;

sending the list of forms to the client computer, wherein an identifier of the form is included in the list of forms;

receiving one or more third messages from the client computer indicating that the user has selected the form from the list of forms;

determining a form identifier from the one or more third messages to identify an entry in a form list table that corresponds with the form;

retrieving form definition information for the form based on the form identifier; and enabling the client computer to display the one or more form elements based on the form definition information.

9. The method of claim 7, further comprising the server computer:

receiving one or more second message from the client computer indicating that the user wants to access the form;

determining a form identifier from the one or more messages to identify an entry in a form list table that corresponds with the form;

retrieving form definition information for the form based on the form identifier; and enabling the client computer to display the one or more form elements based on the form definition information.

10. The method of claim 7, further comprising the server computer:

receiving one or more second messages from the client computer that include the information and an element identifier, which indicates which of the one or more form elements the information is associated with; and storing the information in a data location associated with the form and the element identifier.

11. The method of claim 7, further comprising the client computer:

sending one or more second messages to the server computer indicating that the user wants a list of forms associated with the entity-specific information set;

receiving and displaying the list of forms, wherein an identifier of the form is included in the list of forms;

sending one or more third messages to the server computer indicating that the user has selected the form from the list of forms; and receiving and displaying the one or more form elements sent from the server computer.

12. The method of claim 7, further comprising the client computer:

sending one or more second message to the server computer indicating that the user wants to access the form; and receiving and displaying the one or more form elements sent from the server computer.

13. The method of claim 7, further comprising the client computer:

receiving inputs from the user, wherein the inputs are received through a user interface and are associated with the one or more form elements; and sending one or more second messages to the server computer that include the information and an element identifier, which indicates which of the one or more form elements the information is associated with.

14. A method for managing an electronically-stored, entity-specific information set associated with a manageable entity, the method performed by a client computer comprising:

sending one or more messages to a server computer indicating that a user of the client computer wants to edit a form, wherein the form includes one or more form elements that enable information to be stored in relation to the entity-specific information set, and wherein the one or more form elements are defined by form definition information that is stored by the server computer;

the client computer displaying a form-builder utility that is executed on the server computer, and which enables the user to edit the form by providing user inputs to the form-builder utility through a user interface, wherein the user inputs affect the one or more form elements included in the form;

sending information reflecting the user inputs to the server computer, to enable the server computer to update the form definition information for the form.

15. The method of claim 14, further comprising the client computer:

indicating, in the one or more messages, whether the user wants to create a new form or edit an existing form using the form-builder utility; and if the user wants to edit the existing form, receiving information from the server computer that enables the client computer to display one or more form elements of the existing form based on form definition information for the existing form.

16. The method of claim 15, further comprising the client computer:

if the user wants to create the new form, sending an indication to the server computer that the user wants to use imported form definition information from another form for the new form; and receiving information from the server computer that enables the client computer to display one or more form elements of the new form based on the imported form definition information.

17. The method of claim 15, further comprising the client computer:

if the user wants to create the new form, interacting with the server computer to develop form definition information, wherein the form definition information describes the one or more form elements, so that the server computer can associate the form definition information with the new form.

18. The method of claim 15, further comprising the client computer:

if the user wants to edit the existing form, interacting with the server computer to develop edited form definition information, wherein the edited form definition information describes the one or more form elements, so that the server computer can replace previous form definition information associated with the existing form with the edited form definition information.

19. A method for managing an electronically-stored, entity-specific information set associated with a manageable entity, the method performed by a client computer comprising:

sending one or more first messages to a server computer indicating that a user of the client computer wants the client computer to display a form, wherein the form includes one or more form elements that enable information to be input and stored in relation to the entity-specific information set, wherein the form was produced by a form-builder utility that associated the form with the entity-specific information set;

displaying the form in response to the server computer executing one or more scripts that interact with the client computer to enable the client computer to display the form;

enabling the user to provide user inputs to the form through a user interface, wherein the user inputs include information associated with the one or more form elements; and sending the information reflecting the user inputs to the server computer, to enable the server computer to update form definition information for the form, wherein the form definition information defines the one or more form elements.

20. The method of claim 19, further comprising the client computer:

sending one or more second messages to the server computer indicating that the user wants a list of forms associated with the entity-specific information set;

receiving and displaying the list of forms from the server computer, wherein an identifier of the form is included in the list of forms; and sending one or more third messages to the server computer indicating that the user has selected the form from the list of forms.

21. The method of claim 19, further comprising the client computer:

sending one or more second messages to the server computer indicating that the user wants a list of forms associated with the entity-specific information set;

receiving and displaying the list of forms, wherein an identifier of the form is included in the list of forms;

sending one or more third messages to the server computer indicating that the user has selected the form from the list of forms; and receiving and displaying the one or more form elements sent from the server computer.

22. The method of claim 19, further comprising the client computer:

sending one or more second message to the server computer indicating that the user wants to access the form; and receiving and displaying the one or more form elements sent from the server computer.

23. The method of claim 19, further comprising the client computer:

receiving inputs from the user, wherein the inputs are received through a user interface and are associated with the one or more form elements; and sending one or more second messages to the server computer that include the information and an element identifier, which indicates which of the one or more form elements the information is associated with.

24. A method for managing electronically-stored information associated with one or more business units, the method performed by a client computer comprising:

requesting that a server computer execute one or more scripts that interact with the client computer to enable the client computer to display a form-builder utility, wherein the form-builder utility produces one or more forms, wherein the server computer will access one or more databases to store and retrieve information describing the one or more forms, and wherein the one or more databases store a collection of information for each of the one or more business units, wherein a collection of information for a particular business unit includes a general information set that includes one or more tables that enable access to one or more forms, one or more entity-specific information sets, each of which pertain to a manageable entity and include entity-specific data, and the information describing the one or more forms, wherein a form pertains to one or more manageable entities associated with the particular business unit, and the form includes one or more form elements that enable additional information to be input by the user and stored in relation to the collection of information for the particular business unit, and wherein the information describing the one or more forms includes form definition information, wherein the form definition information defines the one or more form elements, and wherein the form definition information is updatable by the server computer;

displaying the form-builder utility; and enabling the user to edit the one or more forms using the form-builder utility through a user interface.

25. The method of claim 24, further comprising the client computer:

sending one or more messages to the server computer that enable the server computer to determine whether the user wants to create a new form or edit an existing form using the form-builder utility; and if the user wants to edit the existing form, receiving information from the server computer that enables the client computer to display one or more form elements of the existing form based on form definition information for the existing form.

26. The method of claim 25, further comprising the client computer:

if the user wants to create the new form, sending an indication to the server computer that the user wants to use imported form definition information from another form for the new form; and receiving information from the server computer that enables the client computer to display one or more form elements of the new form based on the imported form definition information.

27. The method of claim 25, further comprising the client computer:

if the user wants to create the new form, interacting with the server computer to develop form definition information, wherein the form definition information describes the one or more form elements, so that the server computer can associate the form definition information with the new form.

28. The method of claim 25, further comprising the client computer:

if the user wants to edit the existing form, interacting with the server computer to develop edited form definition information, wherein the edited form definition information describes the one or more form elements, so that the server computer can replace previous form definition information associated with the existing form with the edited form definition information.

29. A method for managing an electronically-stored, entity-specific information set associated with a manageable entity, the method performed by a server computer comprising:

storing form definition information for a form, wherein the form definition information defines one or more form elements of the form;

receiving one or more messages from a client computer indicating that a user of the client computer wants to edit the form;

executing one or more scripts, which interact with the client computer to enable the client computer to display a form-builder utility, and which enable the user to edit the form by providing user inputs to the form-builder utility through a user interface, wherein the user inputs affect the one or more form elements included in the form.

receiving information reflecting the user inputs from the client computer; and updating the form definition information in response to receiving the information reflecting the user inputs.

30. The method of claim 29, further comprising the server computer:

determining, based on the one or more messages, whether the user wants to create a new form or edit an existing form using the form-builder utility;

if the user wants to create the new form, creating a new entry in a form list table, wherein the new entry includes a form identifier, which identifies the new form; and if the user wants to edit the existing form, determining the form identifier from the one or more messages to identify an existing entry in the form list table, retrieving the form definition information for the existing form based on the form identifier, and enabling the client computer to display the one or more form elements of the existing form based on the form definition information.

31. The method of claim 30, wherein creating the new entry includes the server computer storing a form name specified by the user, and an entity identifier, which associates the new form with one or more manageable entities.

32. The method of claim 30, further comprising the server computer:

if the user wants to create the new form, receiving an indication that the user wants to use imported form definition information from another form for the new form;

retrieving the imported form definition information associated with the another form;

associating the imported form definition information with the new entry; and enabling the client computer to display the one or more form elements of the new form based on the imported form definition information.

33. The method of claim 30, further comprising the server computer:

if the user wants to create the new form, interacting with the client computer to develop the form definition information, wherein the form definition information describes the one or more form elements; and associating the form definition information with the new entry in the form list table.

34. The method of claim 30, further comprising the server computer:

if the user wants to edit the existing form, interacting with the client computer to develop edited form definition information, wherein the edited form definition information describes the one or more form elements; and replacing previous form definition information associated with the existing entry in the form list table with the edited form definition information.

35. A method for managing an electronically-stored, entity-specific information set associated with a manageable entity, the method performed by a server computer comprising:

storing form definition information for a form, wherein the form definition information includes defines one or more form elements of the form, and wherein the form the form definition information is updatable by the server computer;

receiving one or more first messages from a client computer indicating that a user of the client computer wants the client computer to display the form;

executing one or more scripts that interact with the client computer to enable the client computer to display the form, and which enable the user to provide user inputs to the form through a user interface, wherein the user inputs include information associated with the one or more form elements;

receiving the information from the client computer; and storing the information, wherein the information is stored in relation to the form and the entity-specific information set.

36. The method of claim 35, further comprising the server computer:

receiving one or more second messages from the client computer indicating that the user wants a list of forms associated with the entity-specific information set;

sending the list of forms to the client computer, wherein an identifier of the form is included in the list of forms;

receiving one or more third messages from the client computer indicating that the user has selected the form from the list of forms;

determining a form identifier from the one or more third messages to identify an entry in a form list table that corresponds with the form;

retrieving form definition information for the form based on the form identifier; and enabling the client computer to display the one or more form elements based on the form definition information.

37. The method of claim 35, further comprising the server computer:

receiving one or more second message from the client computer indicating that the user wants to access the form;

determining a form identifier from the one or more messages to identify an entry in a form list table that corresponds with the form;

retrieving form definition information for the form based on the form identifier; and enabling the client computer to display the one or more form elements based on the form definition information.

38. The method of claim 35, further comprising the server computer:

receiving one or more second messages from the client computer that include the information and an element identifier, which indicates which of the one or more form elements the information is associated with; and storing the information in a data location associated with the form and the element identifier.

39. A method for managing electronically-stored information associated with one or more business units, the method performed by a server computer comprising:

in response to a request from a client computer, executing one or more scripts that interact with the client computer to enable the client computer to display a form-builder utility, which enables a user of the client computer to edit one or more forms through a user interface; and accessing one or more databases to store and retrieve information describing the one or more forms, wherein the one or more databases store a collection of information for each of the one or more business units, and wherein a collection of information for a particular business unit includes a general information set that includes one or more tables that enable access to one or more forms, one or more entity-specific information sets, each of which pertain to a manageable entity and include entity-specific data, and the information describing the one or more forms, wherein a form pertains to one or more manageable entities associated with the particular business unit, and the form includes one or more form elements that enable additional information to be input by the user and stored in relation to the collection of information for the particular business unit, and wherein the information describing the one or more forms includes form definition information, wherein the form definition information defines the one or more form elements, and wherein the form definition information is updatable by the server computer.

40. The method of claim 39, further comprising the server computer:

receiving one or more messages from the client computer that enable the server computer to determine whether the user wants to create a new form or edit an existing form using the form-builder utility;

if the user wants to create the new form, creating a new entry in a form list table, wherein the new entry includes a form identifier, which identifies the new form; and if the user wants to edit the existing form, determining the form identifier from the one or more messages to identify an existing entry in the form list table, retrieving form definition information for the existing form based on the form identifier, and enabling the client computer to display the one or more form elements of the existing form based on the form definition information.

41. The method of claim 40, wherein the new entry further includes a form name specified by the user, and one or more entity identifiers, which associate the new form with the one or more manageable entities.

42. The method of claim 40, further comprising the server computer:

if the user wants to create the new form, receiving an indication that the user wants to use imported form definition information from another form for the new form;

retrieving the imported form definition information associated with the another form;

associating the imported form definition information with the new entry; and enabling the client computer to display the one or more form elements of the new form based on the imported form definition information.

43. The method of claim 40, further comprising the server computer:

if the user wants to create the new form, interacting with the client computer to develop form definition information, wherein the form definition information describes the one or more form elements, and the server computer associating the form definition information with the new entry in the form list table.

44. The method of claim 40, further comprising the server computer:

if the user wants to edit the existing form, interacting with the client computer to develop edited form definition information, wherein the edited form definition information describes the one or more form elements, and the server computer replacing previous form definition information associated with the existing entry in the form list table with the edited form definition information.

45. A system for managing an electronically-stored, entity-specific information set associated with a manageable entity, the system comprising:

a server computer, which executes one or more scripts that interact with a client computer to enable the client computer to display a form-builder utility, and which manages storage of a form produced by the form-builder utility, wherein the form is stored in relation to the entity-specific information set, and wherein the server computer updates, based on information received from the client computer, form definition information for the form, wherein the form definition information defines one or more form elements of the form; and a client computer, which communicates with the server computer over a network, displays the form-builder utility, and provides a user interface that enables a user to edit the form using the form-builder utility, wherein the form includes one or more form elements that enable additional information to be stored in relation to the entity-specific information set.

46. The system of claim 45, further comprising:

one or more databases, accessible to the server computer, which store the form, the entity-specific information set, and the additional information.

47. The system of claim 45, wherein the server computer further:

receives one or more messages from the client computer that enable the server computer to determine whether the user wants to create a new form or edit an existing form using the form-builder utility;

if the user wants to create the new form, creates a new entry in a form list table, wherein the new entry includes a form identifier, which identifies the new form; and if the user wants to edit the existing form, determines the form identifier from the one or more messages to identify an existing entry in the form list table, retrieves form definition information for the existing form based on the form identifier, and enables the client computer to display the one or more form elements of the existing form based on the form definition information.

48. The system of claim 47, wherein the new entry further includes a form name specified by the user, and an entity identifier, which associates the new form with one or more manageable entities.

49. The system of claim 47, wherein the server computer further:

if the user wants to create the new form, receives an indication that the user wants to use imported form definition information from another form for the new form;

retrieves the imported form definition information associated with the another form;

associates the imported form definition information with the new entry; and enables the client computer to display the one or more form elements of the new form based on the imported form definition information.

50. The system of claim 47, wherein the server computer further:

if the user wants to create the new form, interacts with the client computer to develop form definition information, wherein the form definition information describes the one or more form elements, and the server computer associates the form definition information with the new entry in the form list table.

51. The system of claim 47, wherein the server computer further:

if the user wants to edit the existing form, interacts with the client computer to develop edited form definition information, wherein the edited form definition information describes the one or more form elements, and the server computer replaces previous form definition information associated with the existing entry in the form list table with the edited form definition information.

52. A system for managing an electronically-stored, entity-specific information set associated with a manageable entity, the system comprising:

a server computer, which executes one or more scripts that interact with a client computer to enable the client computer to display a form produced by a form-builder utility, wherein the form includes one or more form elements that enable additional information to be entered by a user, and the server computer manages storage of the additional information in relation to the entity-specific information set, and wherein the server computer updates, based on information received from the client computer, form definition information for the form, wherein the form definition information defines the one or more form elements; and the client computer, which communicates with the server computer over a network, displays the form, provides a user interface that enables the user to enter the additional information into the one or more form elements, and sends the additional information to the server computer.

53. The system of claim 52, further comprising:

one or more databases, accessible to the server computer, which store the form, the entity-specific information set, and the additional information.

54. The system of claim 52, wherein the server computer further:

receives one or more first messages from the client computer indicating that the user wants a list of forms associated with the entity-specific information set;

sends the list of forms to the client computer, wherein an identifier of the form is included in the list of forms;

receives one or more second messages from the client computer indicating that the user has selected the form from the list of forms;

determines a form identifier from the one or more second messages to identify an entry in a form list table that corresponds with the form;

retrieves form definition information for the form based on the form identifier; and enables the client computer to display the one or more form elements based on the form definition information.

55. The system of claim 52, wherein the server computer further:

receives one or more messages from the client computer indicating that the user wants to access the form;

determines a form identifier from the one or more messages to identify an entry in a form list table that corresponds with the form;

retrieves form definition information for the form based on the form identifier; and enables the client computer to display the one or more form elements based on the form definition information.

56. The system of claim 52, wherein the server computer further:

receives one or more messages from the client computer that include the additional information and an element identifier, which indicates which of the one or more form elements the additional information is associated with; and stores the additional information in a data location associated with the form and the element identifier.

57. The system of claim 52, wherein the client computer further:

sends one or more first messages to the server computer indicating that the user wants a list of forms associated with the entity-specific information set;

receives and displays the list of forms, wherein an identifier of the form is included in the list of forms;

sends one or more second messages to the server computer indicating that the user has selected the form from the list of forms; and receives and displays the one or more form elements sent from the server computer.

58. The system of claim 52, wherein the client computer further:

sends one or more messages to the server computer indicating that the user wants to access the form; and receives and displays the one or more form elements sent from the server computer.

59. The system of claim 52, wherein the client computer further:

receives inputs from the user, wherein the inputs are received through a user interface and are associated with the one or more form elements; and sends one or more messages to the server computer that include the additional information and an element identifier, which indicates which of the one or more form elements the additional information is associated with.

* * * * *

UNITED STATES PATENT AND TRADEMARK OFFICE
CERTIFICATE OF CORRECTION

PATENT NO. : 7,702,999 B1 Page 1 of 1
APPLICATION NO. : 10/306093
DATED : April 20, 2010
INVENTOR(S) : Douglas Sperr et al.

It is certified that error appears in the above-identified patent and that said Letters Patent is hereby corrected as shown below:

In column 6, line 30, delete ""Coffetyme" and insert -- "Coffeetyme --, therefor.

In column 6, line 57, delete "Coffetyme" and insert -- Coffeetyme --, therefor.

In column 23, line 26, in Claim 29, delete "form." and insert -- form; --, therefor.

Signed and Sealed this

Twenty-fifth Day of May, 2010

David J. Kappos
*Director of the United States Patent and Trademark Office*